United States Patent [19]

Chen et al.

[11] Patent Number: 5,514,296

[45] Date of Patent: * May 7, 1996

[54] GLASSY LOW MOLAR MASS CHIRAL NEMATIC LIQUID CRYSTALLINE COMPOSITIONS AND OPTICAL ARTICLES FORMED THEREFROM

[75] Inventors: Shaw H. Chen, Penfield; Hongqin Shi, Rochester, both of N.Y.

[73] Assignee: The University of Rochester, Rochester, N.Y.

[ * ] Notice: The portion of the term of this patent subsequent to Jan. 3, 2012, has been disclaimed.

[21] Appl. No.: 274,909

[22] Filed: Jul. 14, 1994

Related U.S. Application Data

[63] Continuation-in-part of Ser. No. 153,570, Nov. 16, 1993, Pat. No. 5,378,393.

[51] Int. Cl.$^6$ .......................... C09K 19/52; C09K 19/34; C09K 19/32; G02F 1/13
[52] U.S. Cl. ............................. 252/299.01; 252/299.61; 252/299.62; 359/106
[58] Field of Search ..................... 252/299.01, 299.61, 252/299.62; 359/103, 106

[56] References Cited

U.S. PATENT DOCUMENTS

| | | | |
|---|---|---|---|
| 3,711,181 | 1/1973 | Adams, Jr. et al. | 359/37 |
| 4,293,435 | 10/1981 | Portugall et al. | 252/299.01 |
| 4,410,570 | 10/1983 | Kreuzer et al. | 252/299.01 |
| 4,743,675 | 5/1988 | Watanabe | 428/1 |
| 5,332,522 | 7/1994 | Chen et al. | 252/299.01 |
| 5,378,393 | 1/1995 | Chen et al. | 252/299.01 |

OTHER PUBLICATIONS

Attard et al. *Liquid Crystals* 1992, vol. 11, No. 5, pp. 779–784.
Dehne & Roger, *Liquid Crystals*, 1989, vol. 6, No. 1, pp. 47–62.
Attard and Imrie, *Liquid Crystals*, 1992, vol. 11, No. 5, pp. 785–789.
Inada & Shirata, *J. Mater. Chem.*, 1992, vol. 3(3), pp. 319–320.
Kreuzer et al., *Mol. Cryst. Liq. Cryst.*, 1991, vol. 199, pp. 345–378.
Freidzon et al., *Polymer Preprints*, 1993, vol. 34(1), pp. 146–147.
Percec et al., *Macromolecules*, 1992, vol. 25, pp. 3851–3861.
Wedler et al., *J. Mater. Chem.*, 1991, vol. 1(3), pp. 347–356.
Wedler et al., *J. Mater. Chem.*, 1992, vol. 2(11), pp. 1195–1204.
Schafer et al., *Mol. Cryst. Liq. Cryst.*, 1990, vol. 191, pp. 269–276.
Eichler et al., *Mol. Cryst. Liq. Cryst.*, 1992, vol. 223, pp. 159–168.
Finkelmann, *Angew, Chem. Int. Ed. Engl.*, 1987, vol. 26, pp. 816–824.
Wu et al., *J. Appl. Phys.*, 1990, vol. 68, pp. 78–85.
Gray et al., *J. Chem. Soc. Chem. Commun.*, 1974, pp. 431–432.
Boller et al., *Z. Naturforsch.*, 1978, vol. 33b, pp. 433–438.
Hird et al., *Liquid Crystals*, 1993; vol. 15(2), pp. 123–150.
Krishnamurthy & Chen, *Macromolecules*, 1991, vol. 24, pp. 3481–3484; 1992, vol. 25, pp. 4485–4489.
Chen & Tsai, *Macromolecules*, 1990, vol. 23, pp. 5055–5058.
Tsai & Chen, *Macromolecules*, 1990, vol. 23, pp. 1908–1911.

*Primary Examiner*—Shean Wu
*Attorney, Agent, or Firm*—M. LuKacher

[57] ABSTRACT

A glassy thermotropic chiral nematic liquid crystalline composition comprises a glassy chiral nematic compound of low molar mass that includes a cycloaliphatic radical, a nematogenic moiety, and a chiral moiety, or a mixture of a nematic liquid crystalline compound of low molar mass that includes a cycloaliphatic radical and a nematogenic moiety and a chiral compound of low molar mass that includes a chiral moiety. Each cycloaliphatic radical contains 4 to about 18 carbon atoms. An optical device is formed from the described glassy thermotropic chiral nematic liquid crystalline composition.

42 Claims, No Drawings

GLASSY LOW MOLAR MASS CHIRAL NEMATIC LIQUID CRYSTALLINE COMPOSITIONS AND OPTICAL ARTICLES FORMED THEREFROM

CROSS-REFERENCE TO RELATED APPLICATION

This is a continuation-in-part of prior application Ser. No. 08/153,570, filed Nov. 16, 1993, now U.S. Pat. No. 5,378,393 by S. H. Chen et al., entitled GLASSY CHIRAL NEMATIC LIQUID CRYSTALLINE COMPOSITIONS OF LOW MOLAR MASS AND OPTICAL ARTICLES FORMED FROM SAME.

FIELD OF THE INVENTION

This invention relates to glassy thermotropic chiral nematic liquid crystalline compositions having low molar mass, and more particularly to their use for forming optical devices that produce reflected light in the visible and near infrared regions.

BACKGROUND

Liquid crystalline materials exhibiting the cholesteric mesophase have been proposed for use in a variety of optical device applications, for example, notch filters, circular polarizing filters, selective reflectors, beam splitters, and beam apodizers. U.S. Pat. No. 3,711,181, for example, discloses an optical apparatus for modulating circular-polarized light that contains optically negative liquid crystal films.

Polymeric liquid crystalline compositions have been proposed as potentially useful for the aforementioned applications. U.S. Pat. No. 4,293,435 discloses a liquid-crystalline cholesteric polymer phase that consists essentially of a copolymer of particular nematogenic and chiral acrylic ester monomers. In U.S. Pat. No. 4,410,570 is disclosed a liquid crystalline phase that contains a cyclic organopolysiloxane to which is chemically bonded at least one mesogenic group. Thermotropic cholesteric liquid crystalline glutamate copolymers consisting of chiral glutamate ester repeating units are disclosed in U.S. Pat. No. 4,743,675.

Besides polymeric liquid crystalline compositions, there has been an interest in discovering glass-forming liquid crystalline compounds of low molar mass. For example, Attard et al., *Liquid Crystals*, 1992, Vol. 11, No. 5, pp. 779–784 describes liquid crystalline compounds in which rod-shaped mesogenic groups are attached to a benzene-1, 3,5-tricarbonyl nucleus. "Siamese-twin" molecules in which two rod-shaped mesogenic moieties are linked by a sulfonyl radical are described in Dehne and Roger, *Liquid Crystals*, 1989, Vol. 6, No. 1, pp. 47–62.

Attard and Imrie, *Liquid Crystals*, 1992, Vol. 11, No. 5, pp. 785–789, describes symmetrical liquid crystalline compounds containing a central alkylene chain and a 1-aminopyrene moiety at either end. Liquid crystalline "starburst" molecules, 1,3,5-tris[ 4-(diphenylamino)phenyl]benzene and its methylsubstituted derivatives, are described in Inada and Shirota, *J. Mater Chem.*, 1993, Vol. 3(3), pp 319–320.

Kreuzer et al., *Mol. Cryst. Liq. Cryst.*, 1991, Vol. 199, pp. 345–378, describes cyclic organopolysiloxane compounds containing mesogenic substituents. Liquid crystalline cyclic organopolysiloxanes containing cholesterogenic or chiral substituents are disclosed in U.S. Pat. No. 4,410,570 to Kreuzer and Gawhary. Freidzon et al., *Polymer Preprints*, 1993, Vol. 34(1), pp. 146–147, describes liquid crystalline cyclophosphazene compounds with cholesteryl-substituted mesogenic groups.

Another type of liquid crystalline composition of low molar mass is characterized by inclusion of mesogenic units as part of a macrocycle, as described, for example, in Percec et al., *Macromolecules*, 1992, Vol. 25, pp. 3851–3861.

Wedler et al., *J. Mater. Chem.*, 1991, Vol. 1(3), pp. 347–356, notes that prevention of crystallization in liquid crystalline phases of pure compounds of low molar mass is a serious practical problem and proposes the use of mixtures of compounds. Wedler et al., *J. Mater. Chem.*, 1992, Vol. 2(11), pp. 1195–1204, describes mixtures containing Siamese-twin and naphthyl ester mesogenic compounds. Mixtures of naphthyl esters to form liquid crystalline glassy compositions are also described in Schafer et al., *Mol. Cryst. Liq. Cryst.*, 1990, Vol. 191, pp. 269–276. Eichler et al., *Mol. Cryst. Liq. Cryst.*, 1992, Vol. 223, pp. 159–168, describes the use of mixtures of liquid crystalline compounds containing a cholesteric addendum for the formation of erasable holographic gratings.

Many applications of chiral liquid crystalline materials in optical devices require compositions capable of forming both right- and left-handed helical structures. When a film of such a composition is applied to a substrate, the helical structures must be capable of forming and maintaining the Grandjean texture, in which the helical axis is perpendicular to the substrate surface, to enable the selective reflection of circular-polarized light. An enantiomeric chiral pair of liquid crystalline compositions, whose individual structures are characterized as a right-handed and a left-handed helix, are thus capable of selectively reflecting right-handed and left-handed circular-polarized light, respectively. Especially useful for optical information storage applications are chiral nematic liquid crystalline compositions which form clear, transparent films that absorb no light in the visible region but do selectively reflect visible and near-infrared circular-polarized light.

Although thermotropic liquid crystalline polymers exhibiting stable mesophases at ambient temperature are well known, it is exceedingly difficult to achieve simultaneous mesophase formation and vitrification characteristics at temperatures above the ambient with compounds of low molar mass. A further challenge is presented by the objective of discovering chiral liquid crystalline materials of low molar mass that have the capability of forming both right-handed and left-handed helical structures. In addition, these materials must exhibit solubility characteristics which enable their processing into clear glassy thin films for use as optical devices. All of these requirements are met by chiral nematic liquid crystalline compositions with low molar mass of the present invention.

BRIEF SUMMARY OF THE INVENTION

In accordance with the invention, a glassy thermotropic chiral nematic liquid crystalline composition comprising a glassy chiral nematic compound of low molar mass having the formula:

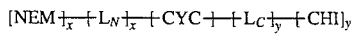

$[\text{NEM}\frac{1}{x}+\text{L}_N\frac{1}{x}+\text{CYC}+\text{L}_C\frac{1}{y}+\text{CHI}]_y$ or a mixture of a nematic liquid crystalline compound of low molar mass having the formula:

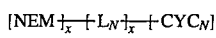

and a chiral compound of low molar mass having the formula:

where

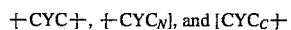

each independently represents a cycloaliphatic radical containing about 4 to 18 carbon atoms;

represents a nematogenic moiety having the formula:

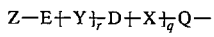

where —Q— is an alkylene radical containing 1 to about 8 carbon atoms, —X— is —O—, —S—, or —CH$_2$—, —Y— is

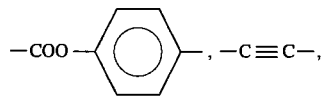

—D— and —E— are each independently

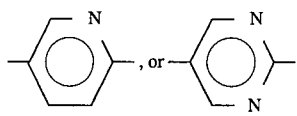

—Z is —CN, —NO$_2$, —N=C=S, or an alkoxy, an alkylsulfonyl, or an arylsulfonyl radical containing up to about 8 carbon atoms, and q and r are each independently 0 or 1;

+CHI]

represents a chiral moiety having the formula:

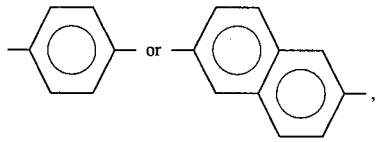

where Q' is an alkylene radical containing 1 to about 8 carbon atoms, —X' is —O—, —S—, or —CH$_2$—, —D'— and —E'— are each independently

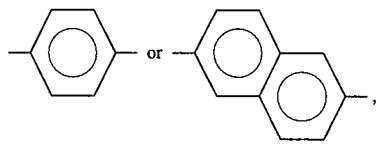

—G— is —C≡C—, —COO—, or —OOC—,

Z' is an alkoxy, aralkoxy, alkylamino, or aralkylamino radical containing about 4 to 20 carbon atoms and containing at least one asymmetric carbon atom, and q', r', and s' are each independently 0 or 1;

[CHI]' represents a chiral compound having the formula:

M—E'—G—D'—CO—Z' where —D'— and —E'— are each independently

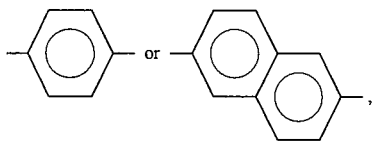

—G— is

—C≡C—, —COO—, or —OOC—,

—M is —H, —CN, —NO$_2$, —N=C=S, —OH, or an alkoxy, an alkylsulfonyl, or an arylsulfonyl radical containing up to about 8 carbon atoms, and Z' is an alkoxy, aralkoxy, alkylamino, or aralkylamino radical containing about 4 to 20 carbon atoms and containing at least one asymmetric carbon atom;

—L$_N$— and —L$_C$— each individually represents a connecting group having the formula:

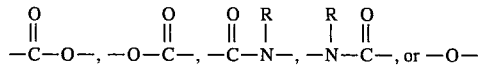

where R is hydrogen or alkyl containing up to 4 carbon atoms, or forms a portion of a cycloaliphatic radical containing about 4 to 18 carbon atoms; and x is 1 to 6, and y is at least 1, with the proviso that when

is chiral, y can be zero.

The invention further provides an optical device formed from a glassy thermotropic chiral nematic liquid crystalline composition as described above.

DETAILED DESCRIPTION

A glassy thermotropic chiral nematic liquid crystalline composition of the present invention can comprise a single pure compound of low molar mass that includes a cycloaliphatic radical to which is attached a nematogenic moiety and a chiral moiety. Alternatively, the composition can comprise mixtures of compounds, such as the following:

(a) a mixture of compounds of low molar mass formed by the attachment of a common nematogenic moiety and a common chiral moiety in differing proportions to a common cycloaliphatic radical;

(b) a mixture of two or more pure chiral nematic liquid crystalline compounds of low molar mass containing different nematogenic or chiral moieties or different cycloaliphatic radicals;

(c) a mixture of one or more nematic liquid crystalline compounds of low molar mass and a chiral compound of low molar mass.

Mixtures obtained by combination of a), b), and c) above are also contemplated.

In accordance with the present invention, cycloaliphatic radicals can contain 4 to about 18 carbon atoms in the ring structure. The ring can contain other atoms in addition to carbon; nitrogen, oxygen and sulfur, for example, can be included in the ring structure, which can comprise up to about 24 atoms. An asymmetric carbon atom can also be included, which imparts chirality to the cycloaliphatic radical and compounds containing it. Furthermore, the cycloaliphatic radical need not contain only a single ring; bicyclic and tricyclic structures are also contemplated. Preferably the cycloaliphatic radical contains about five to ten carbon atoms, most preferably, six carbon atoms.

Nematogenic and chiral moieties can be joined to the cycloaliphatic radicals by carbonyloxy, oxycarbonyl, carbonyl, carbonamido, or oxy connecting groups; the resulting compounds are thus esters, amides, acetals, or ketals.

From 1 to 6 nematogenic moieties can be attached via connecting groups to the cycloaliphatic radical. To form a chiral compound in accordance with the invention, at least one chiral moiety is joined to the cycloaliphatic radical by a connecting group except that, when the cycloaliphatic radical is itself chiral, no addition chiral moieties need be attached.

Table 1 below is a listing of representative compounds from which cycloaliphatic radicals suitable for the practice of the invention can be derived. The listed cycloaliphatic compounds contain substituents such as carboxy, carboxylic anhydride, hydroxy, amino, keto, and formyl to enable formation of the previously described connecting groups. Of course, other substituents such as, for example, alkyl groups containing up to about 4 carbon atoms, can also be present.

Table 1

1,3,5-cyclohexanetricarboxylic acid
(1R, 3S)-(+)-camphoric acid
1,4-cyclohexanedimethanol
1-amino-1-cyclopentanecarboxylic acid
tetrahydrofuran-2,3,4,5-tetracarboxylic acid
2,6-dimethylpiperazine
homopiperazine
1,4,7-triazacyclonanane
1,5,9-triazacyclododecane
1,4,8,11-tetrazacyclotetradecane
1,4,7,10-tetraazacyclododecane
1,4,7,10,13,16-hexaazacyclooctadecane
bicyclo[2.2.2]oct-7-ene-2,3,5,6-tetracarboxyl dianhydride
1,3-adamantanedicarboxylic acid
trans-4-(aminomethyl)cyclohexanecarboxylic acid
1,2,3,4-cyclobutanetetracarboxylic dianhydride
(1R)-(+)-camphor
(1S)-(−)-camphor
cyclohexanecarboxaldehyde A nematogenic moiety as described above contains a mesogenic group, which imparts liquid crystalline characteristics to the moiety and to compositions formed from it. This mesogenic group, which typically has a rod-shaped molecular structure (Cf. H. Finkelmann, *Angew. Chem. Int. Ed. Engl.*, 1987, vol. 26, pp. 816–824), is attached to a flexible link —Q—, which is an alkylene radical having either a straight or branched chain and containing one to about eight, preferably about two to six, carbon atoms. To obtain a liquid crystalline composition with high optical birefringence, it is desirable that the nematogenic moieties contain a multiplicity of conjugated unsaturated bonds; however, this conjugated unsaturation must not cause substantial absorption of light in the visible region by the liquid crystalline composition. Useful mesogenic groups for the practice of the present invention include: biphenyl and diphenylacetylene moieties described in the aforementioned paper by Finkelmann and by Wu et al., *J. Appl. Phys.*, 1990, vol. 68, pp. 78–85; terphenyl groups described by Gray et al., *J. Chem Soc. Chem, Commun.*, 1974, pp. 431–432; diphenylpyrimidines, as reported by Boller et al., *Z. Naturforsch*, 1978, vol. 33b, pp. 433–438; and 2,6-disubstituted naphthalene moieties, as described by Hird et al., *Liquid Crystals*, 1993, vol. 15(2) pp. 123–150. An acetylenic moiety, —C≡C—, and a p-carbonyloxyphenyl moiety are preferred as the —Y— groups. Suitable —Z substituents are described in the aforementioned papers of Finkelmann and Wu et al and include —CN, —NO$_2$, —N=C=S, or alkoxy radicals containing up to about 8 carbon atoms; preferred —Z substituents are cyano or methoxy.

A chiral moiety as described above contains an optically active chiral group that includes at least one asymmetric carbon atom. The chiral moiety also contains a link —Q'—, which is an alkylene radical having either a straight or branched chain and containing one to about eight, preferably about two to six, carbon atoms.

A chiral compound represented by [CHI]' is of low molar mass and contains an optically active chiral group Z' that includes at least one asymmetric carbon atom. The chiral compound [CHI]' also contains the aryl moieties D' and E' connected by —G—, which can be —COO—, —OOC— or, preferably, —C≡C—. An acetylenic moiety, —C≡C—, may also be included in Z'. The chiral compound [CHI]' further contains —M, which can be —H, —CN, —NO$_2$, —N=C=S, —OH, or an alkoxy, an alkylsulfonyl, or an arylsulfonyl radical containing up to about 8 carbon atoms.

In accordance with the present invention, chiral nematic liquid crystalline compositions are characterized by a chiral mole fraction, which is defined as the ratio of the number of moles of chiral moieties to the total number of moles of chiral and nematogenic moieties; this chiral mole fraction is preferably about 0.01–0.7, more preferably, about 0.05–0.5.

As discussed above, compounds comprising the chiral nematic liquid crystalline compositions of the invention are esters, amides, acetals, or ketals. Esters and amides are formed by the reaction of reactive equivalents of carboxylic acids, for example, carboxyl halides, carboxylic anhydrides, and carboxylic esters derived from volatile, low molecular weight alcohols with alcohols and amines, respectively. The carboxylic acid reactive equivalent can be present in the reactant that provides the cycloaliphatic radical, with the reactants that provide the nematogenic and chiral moieties being amines or alcohols. Alternatively, the reactant that is the source of the cycloaliphatic radical can contain amino or hydroxy groups, with the carboxylic acid reactive equivalents being included in the reactants that provide the nematogenic and chiral moieties. Acetals and ketals can be formed by the acid-catalyzed condensation of alcohols containing nematogenic or chiral substituents with aldehydes or ketones, respectively, which are the source of the cycloaliphatic radicals. The aforementioned aldehydes or ketones can also include nematogenic or chiral substituents.

A liquid crystalline composition of the present invention that includes a chiral moiety as described above exhibits selective reflection of visible and near infrared circular-polarized light of wavelength $\lambda_R$. The selective reflection wavelength $\lambda_R$ can be varied by changes in the structure and concentration of the chiral moiety in the liquid crystalline composition. To achieve liquid crystalline compositions whose selective reflection wavelengths are in the visible region, it is necessary that the compositions exhibit adequate helical twisting power. The helical twisting power of a chiral liquid crystalline composition can be determined from the slope of the plot of the reciprocal of the selective reflection wavelength $1/\lambda_R$ vs the mole fraction of the chiral component as the mole fraction approaches zero (cf. S. Krishnamurthy and S. H. Chen, *Macromolecules*, 1991, vol. 24, pp. 3481–3484; 1992, vol. 25, pp. 4485–4489). Helical twisting power of chiral nematic liquid crystalline compositions depends not only on the structure of the chiral moieties but also on the structure of the nematogenic moieties, in particular, the extent of the conjugated unsaturation and the length of the flexible link in these moieties (cf. S. Chen and M. L. Tsai, *Macromolecules*, 1990, vol. 23, pp. 5055–5058).

Many applications of the chiral liquid crystalline compositions of the present invention require a pair of structurally related compositions, one capable of forming a right-handed and the other a left-handed helical structure, which enables them to selectively reflect right-handed and left-handed circular-polarized light, respectively. Using an enantiomeric pair of compounds to form two chiral moieties of opposite chirality, which are then combined with a common nematogenic moiety, provides a pair of liquid crystalline compositions capable of forming right- and left-handed helices. This is illustrated, for example, by the chiral nematic liquid crystalline copolymers containing chiral moieties prepared from R-(+)- and S-(−)-1-phenylethylamine that form helical structures of opposite handedness, as described in M. L. Tsai and S. H. Chen, *Macromolecules*, 1990, vol. 23, pp. 1908–1911.

In accordance with the present invention, optically active compounds preferred for preparing chiral moieties as described above include the enantiomers of 1-phenylethanol, 1-phenylpropanol, 2-methoxy-2-phenylethanol, mandelic acid methyl ester, α-tetralol, 1-phenylethylamine, 1-cyclohexylethylamine, and 3-amino-ε-caprolactam, camphorcarboxylic acid, menthyloxacetic acid, 1-methyl-2 oxocyclohexanepropionic acid methyl ester, 2-phenylpropionic acid, and camphor. Especially preferred are the enantiomeric pairs of 1-phenylethanol and 1-phenylethylamine.

As discussed above, the chiral nematic liquid crystalline compositions of the present invention absorb no light in the visible region but do selectively reflect visible circular-polarized light. They exhibit a helical twisting power sufficient to produce selective reflection wavelengths in the visible and near infrared region and are capable of forming both right- and left-handed helical structures.

In forming an optical device in accordance with the present invention, a film of a chiral nematic liquid crystalline composition is applied to a transparent substrate such as glass or fused quartz. The film can be formed from a melt of the chiral nematic liquid crystalline composition, or it can be formed by applying a solution of the composition in a volatile organic solvent to the substrate, followed by drying to remove the solvent. To utilize the latter method for film formation, it is preferred that the composition be soluble in organic solvents such as methylene chloride, chloroform, tetrahydrofuran, and the like.

The film of the chiral nematic liquid crystalline composition on the substrate has a thickness of about 0.5 μm to 50 μm, preferably about 5 μm to 20 μm. Furthermore, the film in the liquid crystalline phase is capable of forming and maintaining the Grandjean texture, in which the helical liquid crystalline structure in the film is perpendicular to the surface of the substrate.

After the film of the chiral nematic liquid crystalline composition has been applied to the transparent substrate, it is annealed by first heating at a temperature that is above the glass transition temperature but below the clearing temperature of the composition, then cooling to a temperature below the glass transition temperature. In the annealing step, the Grandjean texture is formed in the chiral nematic liquid crystalline film and is maintained when the film is cooled below the glass transition temperature. Annealing is suitably performed at a temperature that is about 0.86 to 0.98, preferably about 0.90 to 0.95, of the clearing temperature for a period of about 0.5 hour to 16 hours, preferably about 1 hour to 2 hours. To form and maintain the Grandjean texture in the film, the clearing temperature should be at least about 30° C. higher than the glass transition temperature.

In Table 2 are shown the formulas of representative nematic and/or chiral cycloaliphatic compounds useful in compositions of the present invention.

TABLE 2

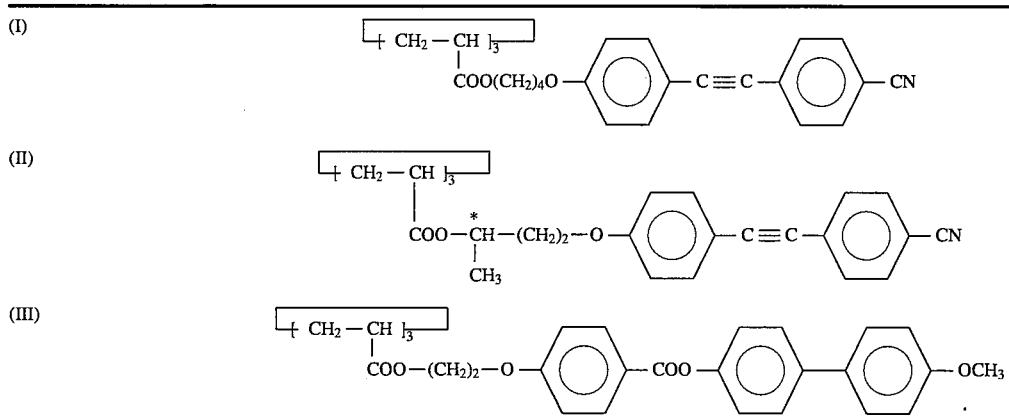

TABLE 2-continued
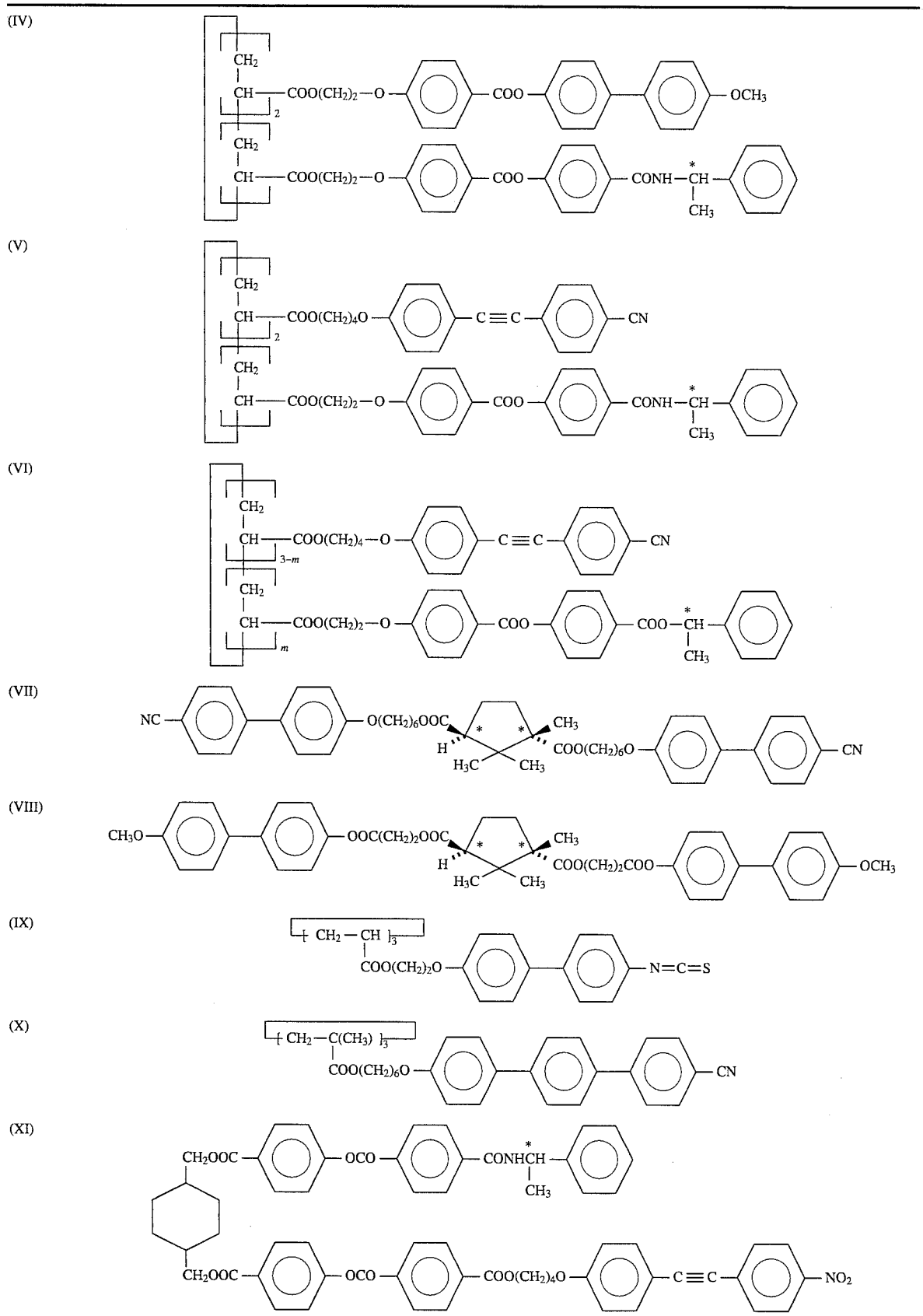

TABLE 2-continued
(XII) 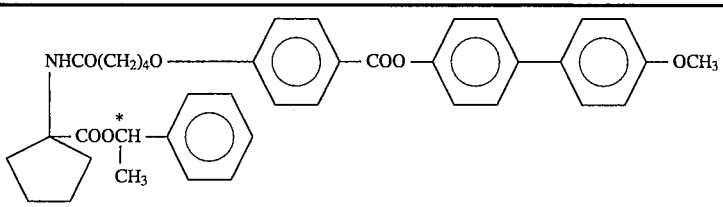
(XIII) 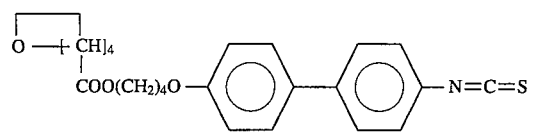
(XIV) 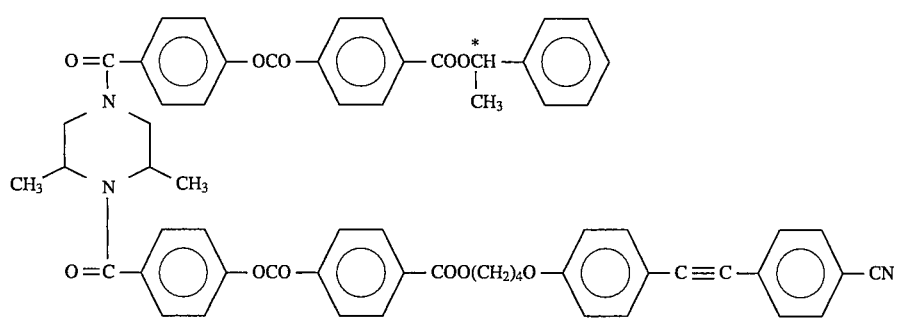
(XV) 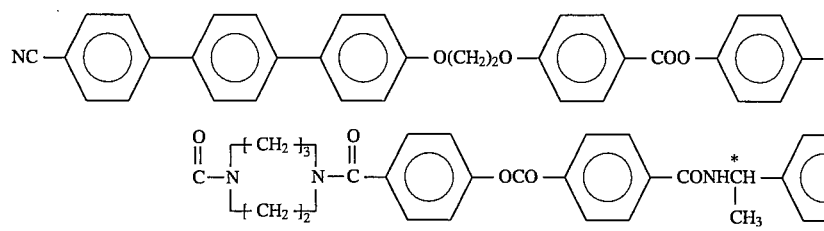
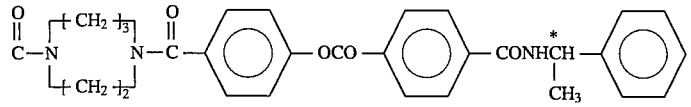
(XVI) 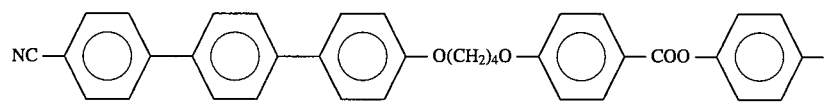
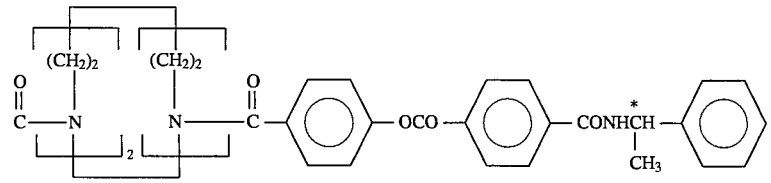
(XVII) 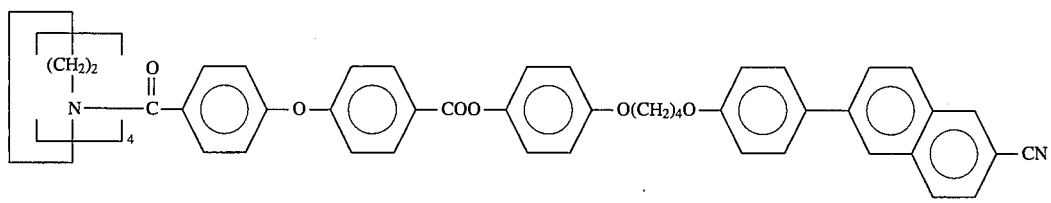
(XVIII) 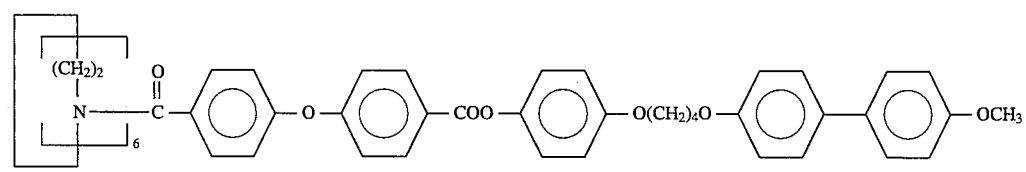

TABLE 2-continued
(XIX) 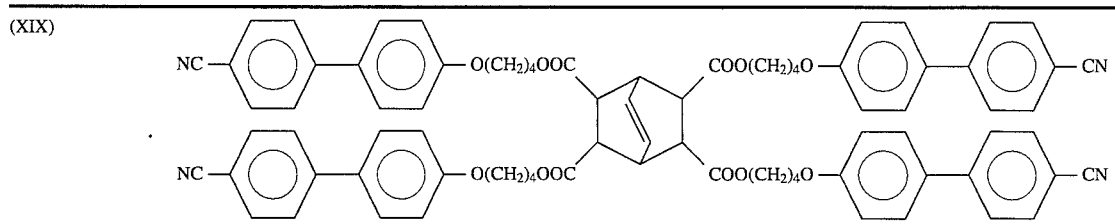
(XX) 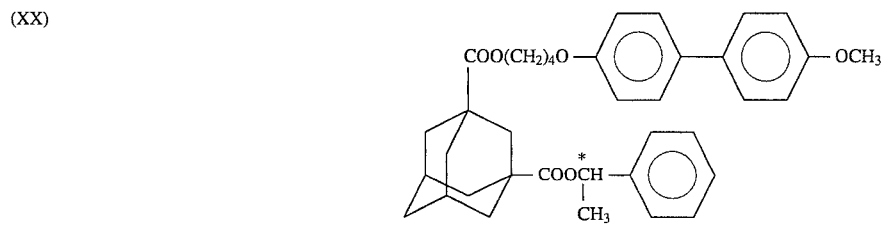
(XXI) 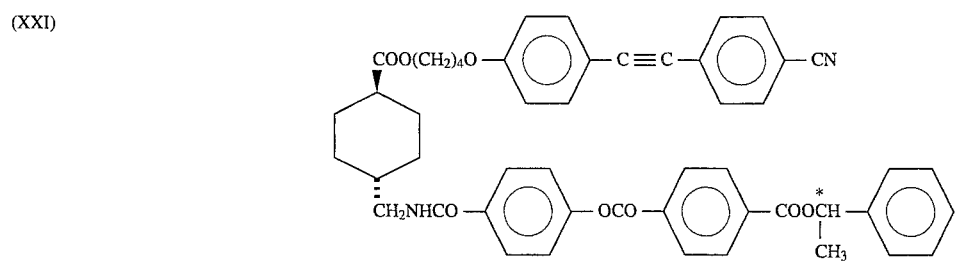
(XXII) 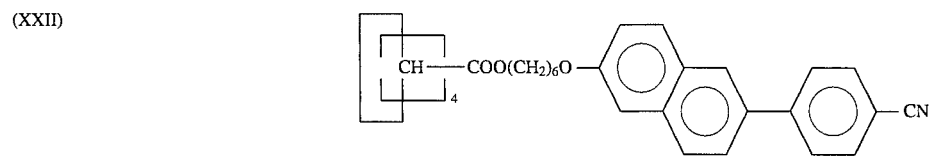
(XXIII) 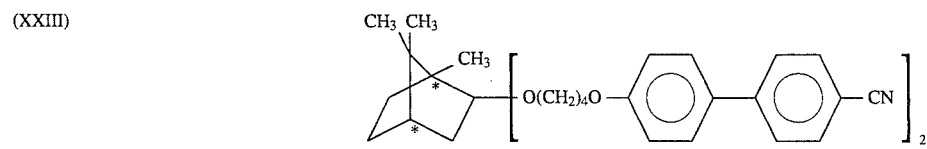
(XXIV) 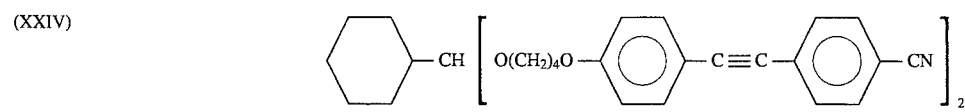
(XXV) 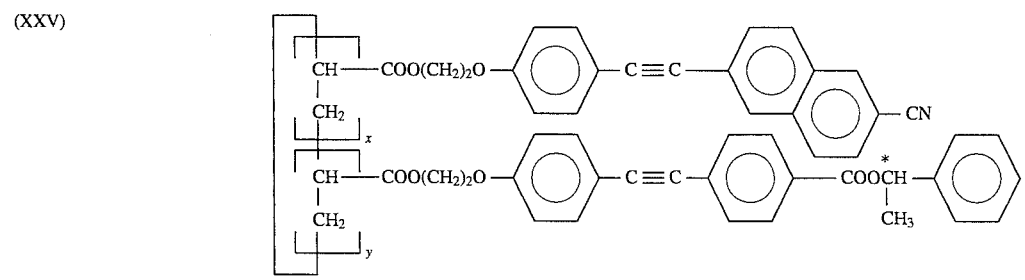
(a) x = 3, y = 0
(b) x = 2, y = 1
(c) x = 1, y = 2
(d) x = 0, y = 3
In Table 3 below are shown the formulas of representative chiral compounds [CHI]' useful in compositions of the present invention.

TABLE 3
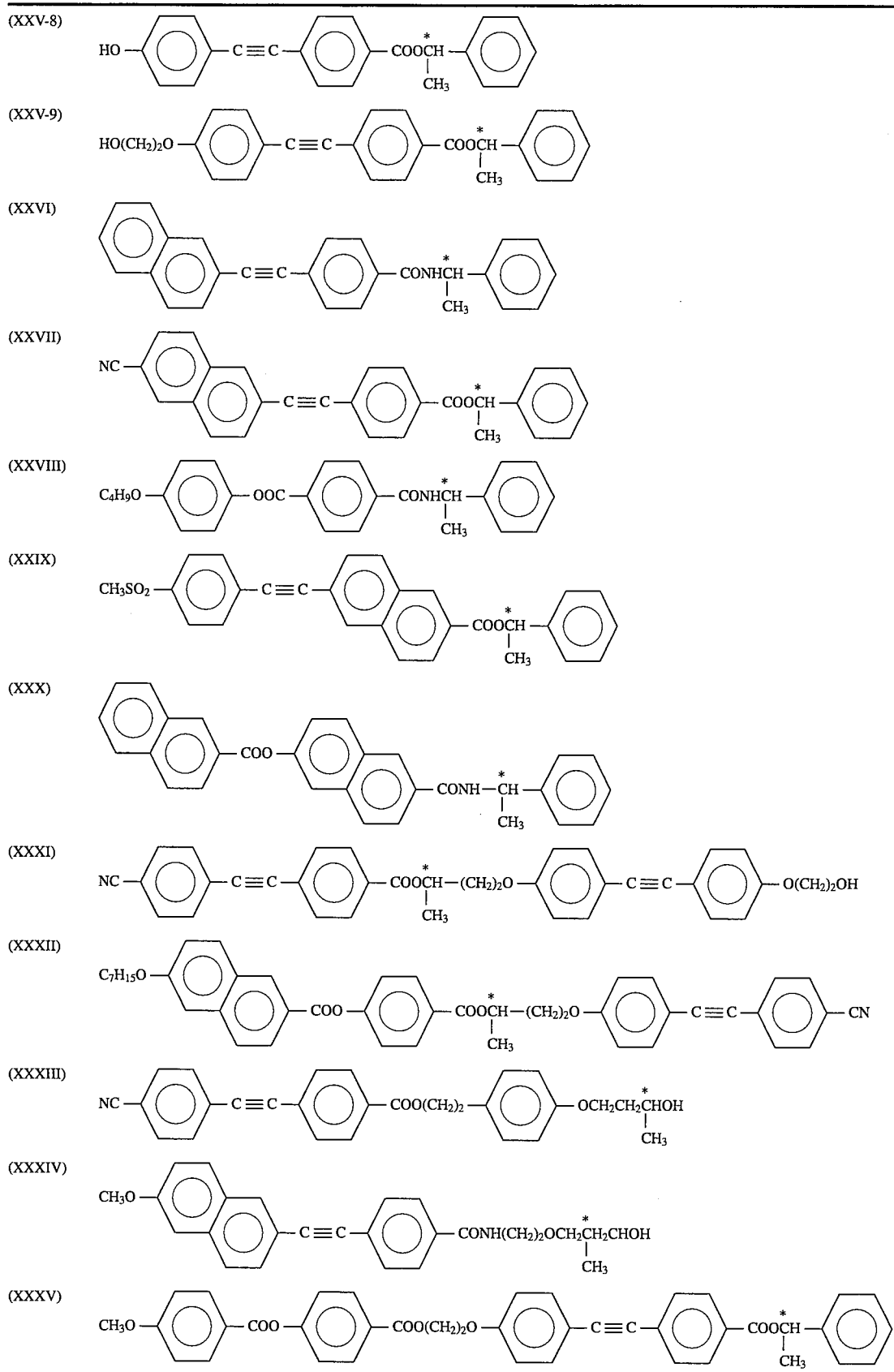

TABLE 3-continued
(XXXVI)
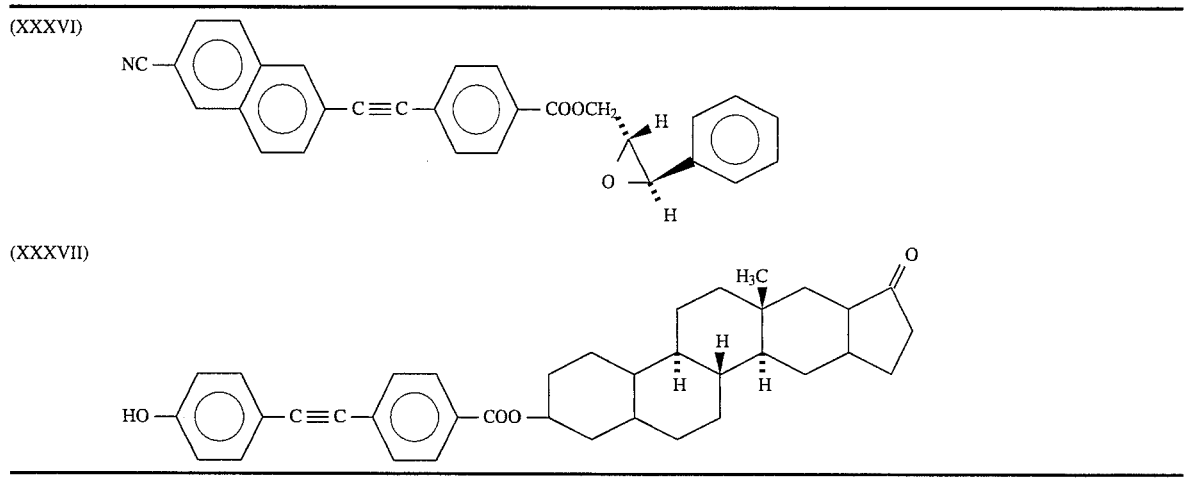
(XXXVII)
The following examples further illustrate the invention.
EXAMPLE 1
Preparation of Compound (I)
Compound (I) was prepared by the following reaction scheme:
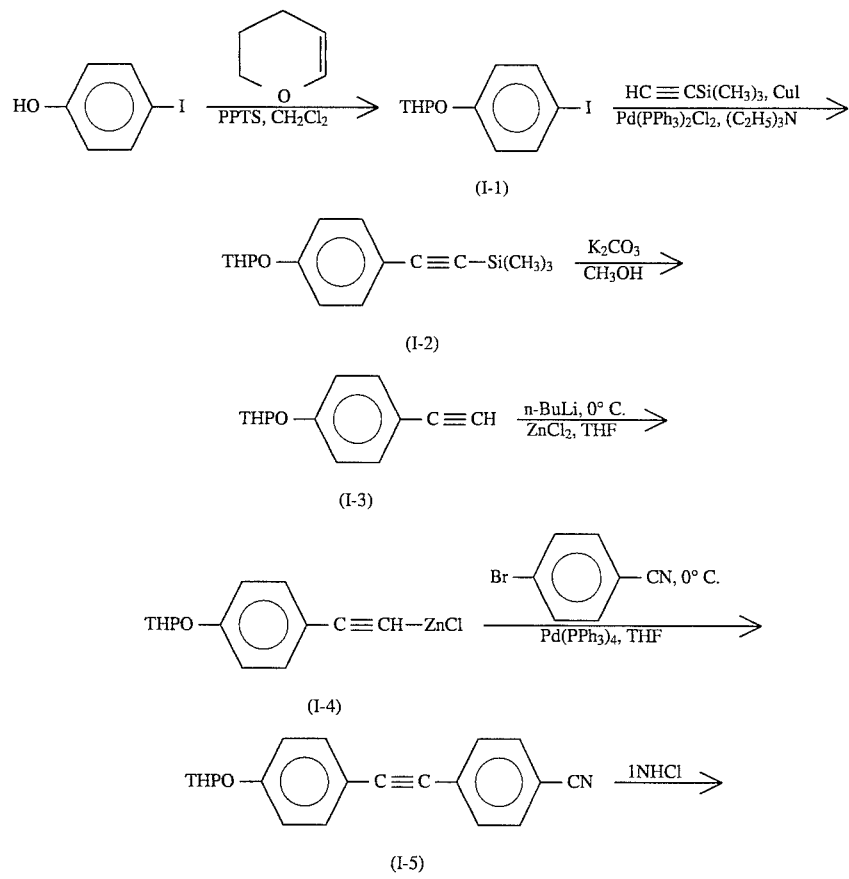

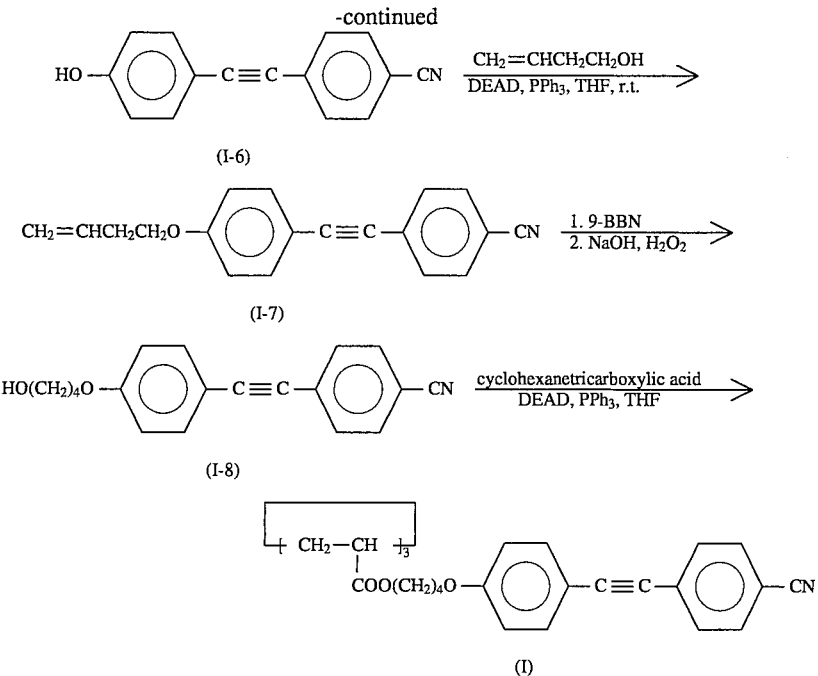

(I-1):

A solution of 4-iodophenol (74.4 g, 338 mmole) and dihydropyran (84.1 g, 1 mole) in 800 mL of anhydrous methylene chloride containing pyridinium p-toluenesulfonate, PTTS, (17.5 g, 69.6 mmole) was stirred at room temperature for 5 hr. Then the solution was diluted with ether and washed several times with half-saturated brine to remove the catalyst. After evaporation of the solvent, the residue was recrystallized from ethanol to yield the tetrahydropyranyl (THP) ether (I-1) (90g, 85%).

(I-2):

To a mixture of (I-1) (25 g, 82.2 mmole) and (trimethylsilyl)acetylene (12 g, 122 mole) in 300 mL of triethylamine were added bis(triphenylphosphine) palladium dichloride (1 g, 1.40 mmole) and copper(I) iodide (9.133 g, 0.70 mmole). The reaction mixture was stirred under nitrogen at room temperature for 3 hr before the solvent was removed under reduced pressure. The residue was extracted with 500 mL of petroleum ether; the extract was filtered, and the filtrate was washed with water and dried over anhydrous MgSO$_4$. After evaporation of the solvent, the crude product was purified by flash chromatography on silica gel using 1:15 diethyl ether/petroleum ether as the eluent. The pale yellowish solid was recrystallized from ethanol to yield (I-2) (15 g, 66%).

(I-3):

5.0 g (I-2) (18.2 mmole) and anhydrous potassium carbonate (1.0 g, 7.23 mmole) were dissolved in 100 mL of methanol and stirred for 2 hr. The solvent was then evaporated, and the residue was dissolved in 200 mL of petroleum ether. The solution was washed with water, dried over anhydrous MgSO$_4$, and evaporated. Recrystallization of the residue from ethanol gave (I-3) (3.62 g, 98%).

(I-4):

To a solution of (I-3) (3.4 g, 16.8 mmole) in 10 mL of anhydrous tetrahydrofuran (THF) at 0° C. was added n-butyllithium (0.078 g, 16.8 mmole) in hexane (2M). The solution was stirred for 5 min prior to adding anhydrous zinc chloride (2.29 g, 16.8 mmole) dissolved in anhydrous THF (20 mL). The mixture was stirred at room temperature for an additional 15 min.

(I-5) & (I-6):

To the solution containing (I-4) cooled to 0° C., a solution of 4-bromobenzonitrile (3.07 g, 16.8 mmole) in anhydrous THF (20 mL) and a solution of tetrakis(triphenylphosphine) palladium (0.5 g, 0.43 mmole) in anhydrous THF (20 mL), both at 0° C., were added sequentially to obtain (I-5), which was not isolated. Instead, 30 mL of 1N HCl solution and 10 g of ammonium chloride were added to form two clearly separated layers, which were stirred at room temperature for another 3 hr to deprotect the hydroxyl group. The two layers were separated upon shaking with 50 mL of petroleum ether, and the aqueous portion was extracted with petroleum ether. The organic portions were combined, washed with a saturated aqueous solution of sodium bicarbonate, and dried over anhydrous MgSO$_4$. After the solvent was evaporated off under reduced pressure, the brown residue was purified by flash chromatography on silica gel with methylene chloride as the eluent. The yellowish product was recrystallized from chloroform to give (I-6) (2.35 g, 64%).

(I-7):

To a stirred solution containing (I-6) (3.0 g, 13.68 mmole), triphenylphosphine (4.31 g, 16.41 mmole) and 3-buten-1-ol (1.42 mL, 16.41 mmole) in 30 ml of anhydrous THF was added dropwise a solution of diethyl azodicarboxylate (DEAD) (2.02 mL, 16.41 mmole) in 10 mL of anhydrous THF under a nitrogen atmosphere. The reaction mixture was stirred for 3 hr before the solvent was evaporated. The solid residue was purified by flash chromatography on silica gel with 10:1 methylene chloride/hexane as the solvent and the eluent. Further purification was accomplished via recrystallization from methanol containing a little methylene chloride to yield (I-7) (3.39 g, 91%).

(I-8):

To a stirred solution of (I-7) (2.42 g, 8.86 mmole) in 10 mL of anhydrous THF was added slowly 0.5M solution of 9-borabicyclo[3,3,1]nonane (9-BBN) in THF (21.27 mL, 10.64 mmole). The reaction mixture was stirred for 4 hr at room temperature; then 5 mL of ethanol, 2 mL of 6N sodium hydroxide solution, and 4 mL of 30% hydrogen peroxide solution were added sequentially. The reaction was allowed to proceed for another hour before dilution with 100 mL of methylene chloride. The solution was washed with water and dried over anhydrous MgSO$_4$. Upon evaporating the solvent, the solid residue was purified by flash chromatography on silica gel with methylene as the eluent. Further purification was accomplished via recrystallization from ethanol, yielding (I-8) (2.36 g, 92%).

(I):

To a stirred solution containing (I-8) (0.606 g, 2.08 mmole), triphenylphosphine (0.55 g, 2.08 mmole) and 1,3,5-cyclohexanetricarboxylic acid (0.136 g, 0.631 mmole) (95% cis, from Aldrich Chemical Co.) in 15 mL of anhydrous THF was added dropwise a solution of diethyl azodicarboxylate (DEAD) (0.255 mL, 2.08 mmole) in 5 mL of anhydrous THF under a nitrogen atmosphere. The reaction mixture was stirred for 3 hr before the solvent was evaporated. The solid residue was purified by flash chromatography on silica gel with 40:1 methylene chloride/acetone as the solvent and the eluent. Further purification was accomplished via recrystallization from methanol containing a little methylene chloride, yielding (I) (0.62 g, 95%). Elemental analysis: % Calculated: C, 76.50; H, 5.51; N, 4.06; % Found: C, 76.25; H, 5.72; N, 4.07.

Thermal transition temperatures were determined for (I), using differential scanning calorimetry. Its glass transition temperature, $T_g$, was 28° C.; its clearing temperature, $T_c$, was 124° C.

EXAMPLE 2

Preparation of Compound (II)

Compound (II) was prepared by the following reaction scheme:

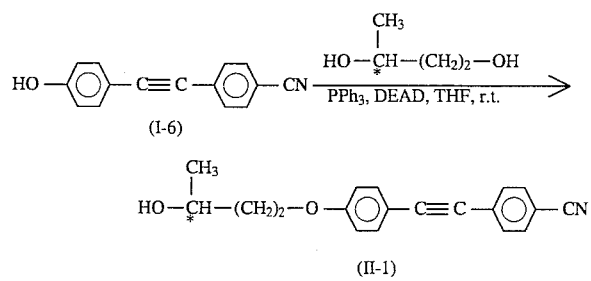

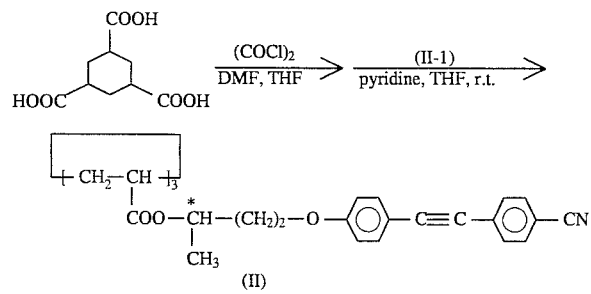

(II-1):

To a stirred solution containing (I-6) (0.86 g, 3.93 mmole), triphenylphosphine (1.24 g, 4.71 mmole), and (S)-(+)-1,3-butanediol (0.42 g, 4.71 mmole) in 10 mL of anhydrous THF was added dropwise a solution of diethyl azodicarboxylate (DEAD) (0.41 mL, 4.71 mmole) in 5 mL of anhydrous THF under a nitrogen atmosphere. The reaction mixture was stirred for 3 hr before the solvent was evaporated. The solid residue was purified by flash chromatography on silica gel with 20:1 methylene chloride/acetone as the solvent and the eluent to obtain (II-1) (0.8 g, 70%).

(II):

To a solution containing 1,3,5-cyclohexanetricarboxylic acid (0.165 g, 0.76 mmole) and a few drops of N,N-dimethylformamide in 10 mL of anhydrous THF was added dropwise 2M oxalyl chloride solution in anhydrous THF (1.37 mL of solution containing 2.75 mmole of oxalyl chloride) at room temperature. After stirring the reaction mixture for 1 hr, the solvent was evaporated, and excess oxalyl chloride was removed under vacuum. The resultant acid chloride was dissolved in 10 mL of anhydrous THF, and the solution was added to a mixture of (II-1) (0.80 g, 2.75 mmole) and pyridine (0.22 mL, 2.75 mmole) in 10 mL of anhydrous THF. The reaction mixture was stirred for 12 hr before the solvent was evaporated. The solid residue was purified by flash chromatography on silica gel with methylene chloride as the solvent and the eluent. Further purification was accomplished via precipitation from methanol, yielding (II) (0.71 g, 90%). Elemental analysis: % Calculated: C, 76.50; H, 5.51; N, 4.06; % Found: C, 76.23; H, 5.68; N, 4.04.

EXAMPLE 3

Preparation of Compound (III)

Compound (III) was prepared by the following reaction scheme:

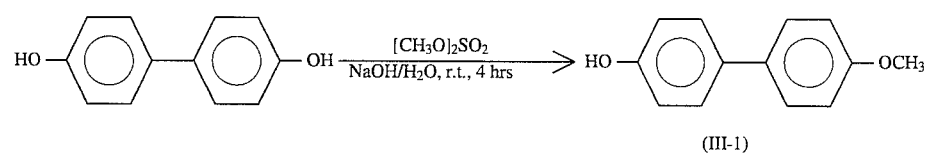

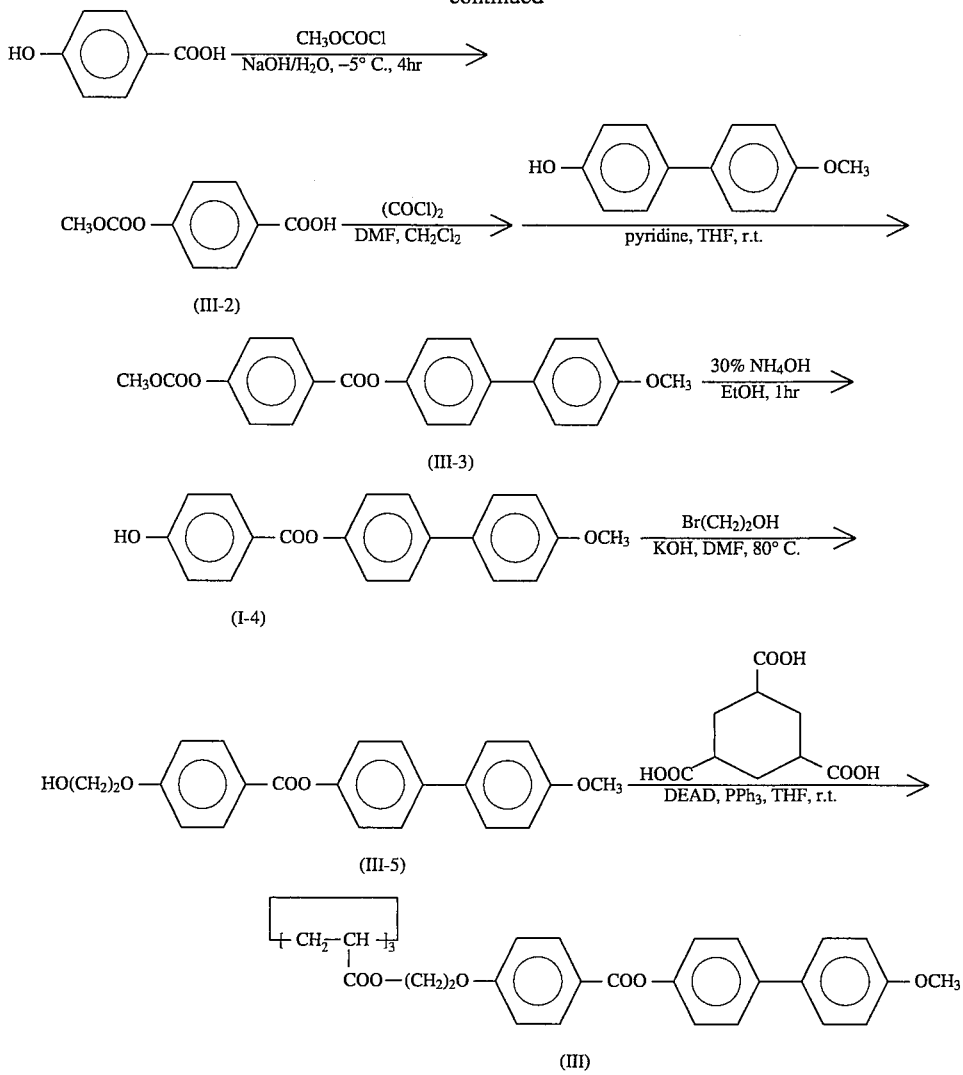

(III-1):

4,4'-dihydroxybiphenyl (40.0 g, 0.215 mole) was dissolved in a solution of sodium hydroxide (17.2 g, 0.43 mole) in 160 mL of water, to which dimethyl sulfate (27 g, 0.214 mole) was then added. The solution was stirred at room temperature for 4 hr. The precipitate was isolated by filtration, washed with 10% aqueous sodium hydroxide solution, and dissolved in boiling water. Traces of insoluble 4,4'-dimethoxybiphenyl were separated by hot filtration. The crude product was precipitated upon addition of dilute hydrochloric acid to the filtrate. The precipitate was collected, washed with water, and recrystallized from ethanol to yield (III-1) (30 g, 70%).

(III-2):

To a solution of sodium hydroxide (30.0 g, 0.75 mole) in 800 mL of water was added 4-hydroxybenzoic acid (35.8 g, 0.259 mole). The solution was then cooled to −10° C.; then methyl chloroformate (40.0 g, 0.423 mole) was slowly added, the temperature not being allowed to exceed −5° C. The resulting slurry was stirred for 4 hr before acidification to pH5 with concentrated hydrochloric acid. The crude product was isolated by filtration and recrystallized from ethanol to yield (III-2) (35.0g, 69%).

(III-3):

To a solution containing (I-2) (10.0 g, mole) and a few drops of N,N-dimethylformamide in 200 mL of methylene chloride was added dropwise oxalyl chloride (6.65 ml, 0.06 mole) at room temperature. The reaction mixture was stirred for 1 hr; the solvent was then evaporated, and excess oxalyl chloride was removed under vacuum. The resultant acid chloride in 100 mL of anhydrous THF was added to a solution of (I-1) (12.3 g, 0.06 mole) and pyridine (4.95 ml, 0.06 mole) in 100 mL of anhydrous THF at room temperature. The mixture was stirred for 12 hr before dilution with 500 mL of chloroform. The solution was washed with water and then dried over anhydrous sodium sulfate. Following evaporation of the solvent, the residue was recrystallized from ethanol to yield (III-3) (11.5 g, 61%).

(III-4):

To a solution of 10.0 g (0.026 mole) (I-3) in 200 mL of 95% ethanol was added 30% ammonium hydroxide (30 mL) at room temperature. The reaction mixture was stirred for 1 hr and then acidified to pH5 with concentrated hydrochloric acid. The solution was diluted with 200 mL of chloroform, and the organic phase was washed with water before drying over anhydrous sodium sulfate. The solvent was removed to yield (III-4) (7.6 g, 90%).

(III-5):

To a solution containing (I-4) (3.0 g, 9.38 mmole) and potassium hydroxide (0.63 g, 11.3 mmole) in 10 mL of N,N-dimethylformamide was added dropwise 1-bromoethanol (0.94 mL, 11.3 mmole) at 80° C. The reaction mixture was stirred at 80° C. for 24 hr before dilution with 100 mL of methylene chloride. The solution was washed with water and dried over anhydrous sodium sulfate. After removal of the solvent, the solid was recrystallized from ethanol to yield (III-5) (1.6 g, 46%).

(III):

To a stirred solution containing (I-5) (0.5 g, 1.37 mmole), triphenyl phosphine (0.36 g, 1.37 mmole) and 1,3,5-cyclohexanetricarboxylic acid (0.084 g, 0.38 mmole) in 15 mL of anhydrous THF was added dropwise a solution of diethyl azodicarboxylate (DEAD) (0.17 ml, 1.37 mmole) in 5 mL of anhydrous THF under nitrogen atmosphere. The reaction mixture was stirred for 3 hr before evaporating the solvent. With 40:1 methylene chloride/acetone both as solvent and eluent, the solid residue was purified by flash chromatography on silica gel. Further purification was accomplished via recrystallization from methanol containing a little methylene chloride to yield (III) (0.5 g, 90%).

Using differential scanning calorimetry, the glass transition temperature, $T_g$, and clearing temperature, $T_c$, for (III) were determined to be 177° C. and 278° C., respectively.

EXAMPLE 4

Preparation of Compound (IV)

Compound (IV) was prepared by the following reaction scheme:

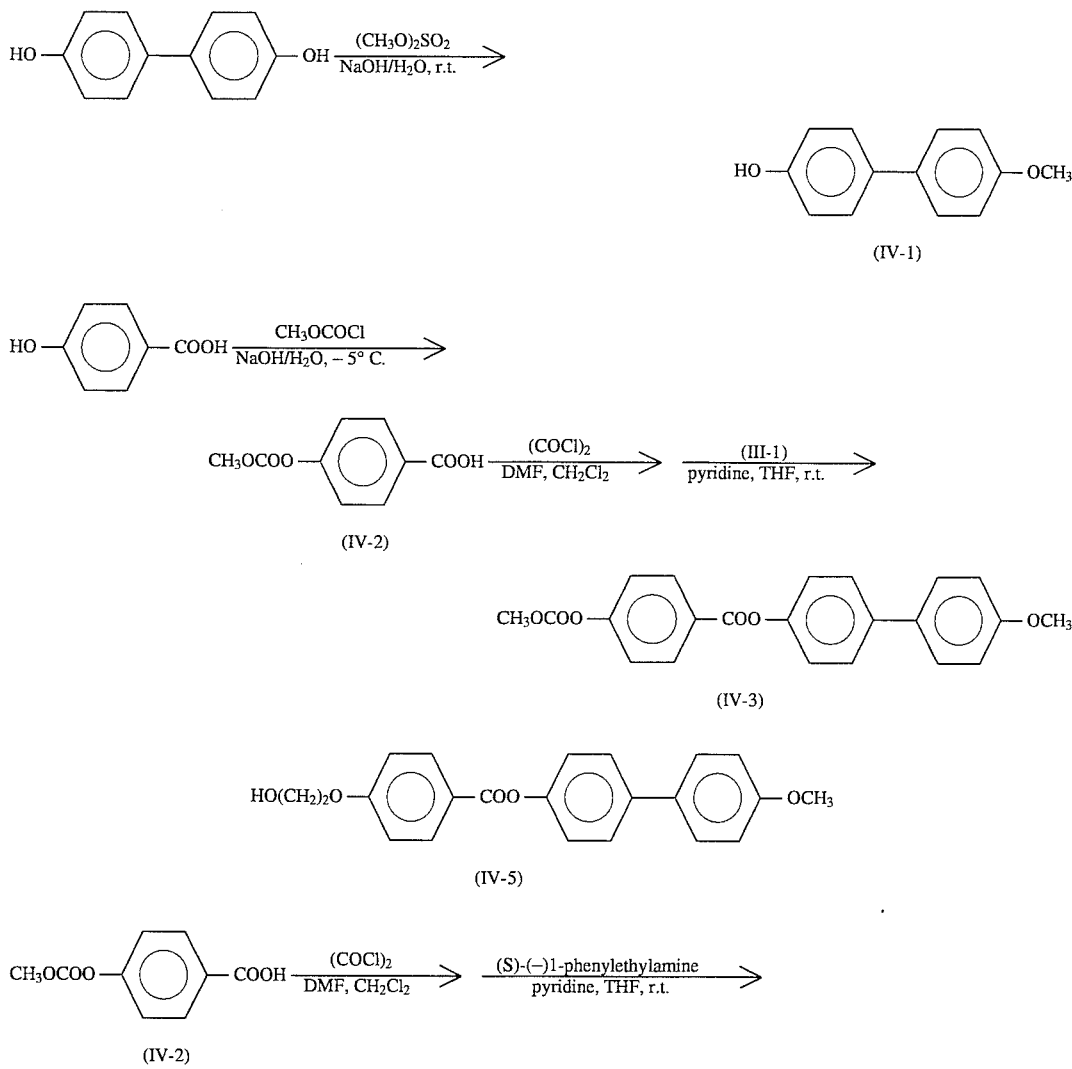

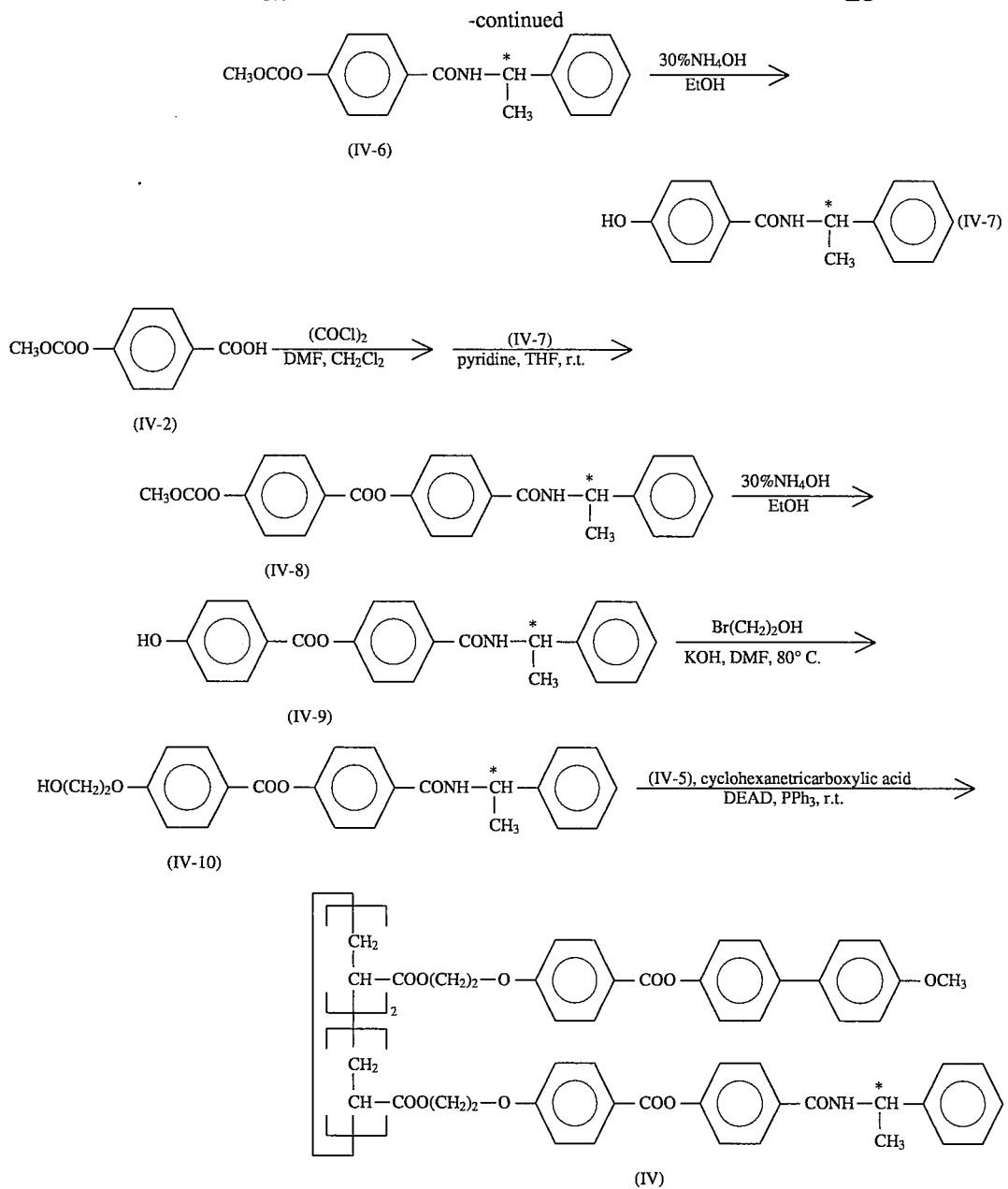

(IV-1):

4,4'-dihydroxybiphenyl (40.0 g, 0.215 mole) was dissolved in a solution sodium hydroxide (17.2 g, 0.43 mole) in 160 mL of water, to which dimethyl sulfate (27 g, 0.214 mole) was then added. The mixture was stirred at room temperature for 4 hr. The precipitate was isolated by filtration, washed with 10% aqueous sodium hydroxide solution and dissolved in boiling water. Traces of insoluble 4,4'-dimethoxybiphenyl were separated by hot filtration. The crude product was precipitated upon addition of dilute hydrochloric acid to the filtrate. The precipitate was collected, washed with water, and recrystallized from ethanol to yield (IV-1) (30 g, 70%).

(IV-2):

To a solution of sodium hydroxide (30.0 g, 0.75 mole) in 800 mL of water was added 4-hydroxybenzoic acid (35.8 g, 0.259 mole). The solution was then cooled to −10° C., and methyl chloroformate (40.0 g, 0.423 mole) was slowly added, the temperature not being allowed to exceed −5° C. The resulting slurry was stirred for 4 hr before acidification to pH5 with concentrated hydrochloric acid. The crude product was isolated by filtration and recrystallized from ethanol to yield (IV-2) (35.0 g, 69%).

(IV-3):

To a solution containing (IV-2) (10.0 g, 0.05 mole) and a few drops of N,N-dimethylformamide in 200 mL of methylene chloride was added dropwise oxalyl chloride (6.65 mL, 0.06 mole) at room temperature. The reaction mixture was stirred for 1 hr. The solvent was then evaporated, and excess oxalyl chloride was removed under vacuum. The resultant acid chloride in 100 mL of anhydrous THF was added to a solution containing (IV-1) (12.3 g, 0.06 mole) and pyridine (4.95 mL, 0.06 mole) in 100 mL of anhydrous THF at room temperature. The mixture was stirred for 12 hr before dilution with 500 mL of chloroform. The solution was washed with water and then dried over anhydrous sodium sulfate. After removal of the solvent, the solid residue was recrystallized from ethanol to yield (IV-3) (11.5 g, 61%).

(IV-4):

To a solution of 10.0 g (0.026 mole) (IV-3) in 200 mL of 95% ethanol was added 30% ammonium hydroxide (30 mL) at room temperature. The reaction mixture was stirred for 1 hr and then acidified to pH5 with concentrated hydrochloric acid. The solution was diluted with 200 mL of chloroform, and the organic phase was washed with water before drying over anhydrous sodium sulfate. The solvent was removed to yield (IV-4) (7.6 g, 90%).

(IV-5):

To a solution at 80° C. of (IV-4) (3.0 g, 9.38 mmole) and potassium hydroxide (0.63 g, 11.3 mmole) in 10 mL of N,N-dimethylformamide was added dropwise 1-bromoethanol (0.94 mL, 11.3 mmole). The reaction mixture was stirred at 80° C. for 24 hr before dilution with 100 mL of methylene chloride. The resulting solution was washed with water and dried over anhydrous sodium sulfate. Following removal of the solvent, the residue was recrystallized from ethanol to yield (IV-5) (1.6 g, 46%).

(IV-6):

To a solution containing (IV-2) (3.0 g, 15.3 mmole) and a few drops of N,N-dimethylformamide in 30 mL of methylene chloride was added dropwise oxalyl chloride (2.53 g, 20 mmole) at room temperature. After stirring for 1 hr, the solvent was evaporated, and excess oxalyl chloride was removed under vacuum. The resultant acid chloride was dissolved in 20 mL of anhydrous THF, which was mixed with a solution of (S)-(–)-1-phenylethylamine (2.22 g, 18 mmole) and pyridine (1.57 g, 20 mmole) in 20 mL of anhydrous THF at room temperature. The reaction mixture was stirred for 12 hr before dilution with 200 mL of chloroform. The solution was washed with water and then dried over anhydrous sodium sulfate. After removal of the solvent, the solid residue was recrystallized from ethanol to yield (IV-6) (2.69 g, 73%).

(IV-7):

To a solution of (IV-6) (2.69 g, 9.0 mmole) in 150 mL of 95% ethanol was added 30% ammonium hydroxide (30 mL) at room temperature. The reaction mixture was stirred for 1 hr before being acidified to pH5 with concentrated hydrochloric acid. The solution was diluted with 150 mL of chloroform, and the organic portion was washed with water before drying over anhydrous sodium sulfate. The solvent was then removed, yielding (IV-7) (1.95 g, 90%).

(IV-8):

To a solution containing (IV-2) (1.50 g, 7.65 mmole) and a few drops of N,N-dimethylformamide in 10 mL of methylene chloride was added dropwise oxalyl chloride (0.8 ml, 9.18 mmole) at room temperature. After stirring for 1 hr, the solvent was evaporated, and excess oxalyl chloride was removed under vacuum. The resultant acid chloride was dissolved in 10 mL of anhydrous THF, and the solution was mixed with a solution of (III-7) (2.20 g, 9.18 mmole) and pyridine (0.74 mL, 9.18 mmole) in 10 mL of anhydrous THF. The reaction mixture was stirred for 12 hr before dilution with 100 mL of chloroform. The resulting solution was washed with water and dried over anhydrous sodium sulfate. Following removal of the solvent, the solid was recrystallized from ethanol to yield (IV-8) (2.0 g, 63%).

(IV-9):

To a solution of (IV-8) (2.13 g, 5.03 mole) in 100 mL of 95% ethanol was added 20 mL of 30% ammonium hydroxide at room temperature. The reaction mixture was stirred for 1 hr before acidification to pH5 with concentrated hydrochloric acid. The solution was then diluted with 100 mL of chloroform, and the resulting solution was dried over anhydrous sodium sulfate. The solvent was removed to yield (IV-9) (1.73 g, 95%).

(IV-10):

To a solution at 80° C. of (IV-9) (1.73 g, 4.78 mmole) and potassium hydroxide (0.32 g, 5.73 mmole) in 10 mL of N,N-dimethylformamide was added dropwise 1-bromoethanol (0.48 mL, 5.73 mmole). The reaction mixture was stirred for 24 hr at 80° C. before dilution with 100 mL of methylene chloride. The resulting solution was dried over anhydrous sodium sulfate. Following removal of the solvent, the solid was recrystallized from ethanol to yield (IV-10) (1.0 g, 52%).

(IV):

To a stirred solution of (IV-5) (0.50 g, 1.37 mmole), (IV-10) (0.279 g, 0.687 mmole), triphenylphosphine (0.54 g, 2.06 mmole) and 1,3,5-cyclohexanetricarboxylic acid (0.124 g, 0.573 mmole) in 15 mL of anhydrous THF was added dropwise a solution of diethyl azodicarboxylate (DEAD) (0.253 mL, 2.06 mmole) in 5 mL of anhydrous THF under a nitrogen atmosphere. The reaction mixture was stirred for 3 hr before the solvent was evaporated. The solid residue was purified by flash chromatography on silica gel with 40:1 methylene chloride/acetone as the solvent and the eluent. Further purification was accomplished via precipitation from methanol, yielding (IV) (0.66 g, 90%). Elemental analysis: % Calculated: C, 71.35; H, 5.33; N, 1.08; % Found: C, 71.16; H, 5.36; N, 1.13.

Differential scanning calorimetry measurements with (IV) gave a glass transition temperature, $T_g$, of 69° C. and a clearing temperature, $T_c$, of 137° C.

EXAMPLE 5

Preparation of Compound (V)

Compound (V) was prepared by the same procedure used for (IV), with the exception that (I-8) was used in place of (IV-5) in the last step.

EXAMPLE 6

Preparation of Chiral Nematic Mixture (VI)

The chiral nematic mixture (VI) was prepared by the following reaction scheme:

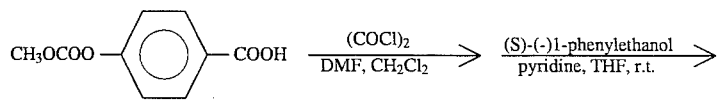

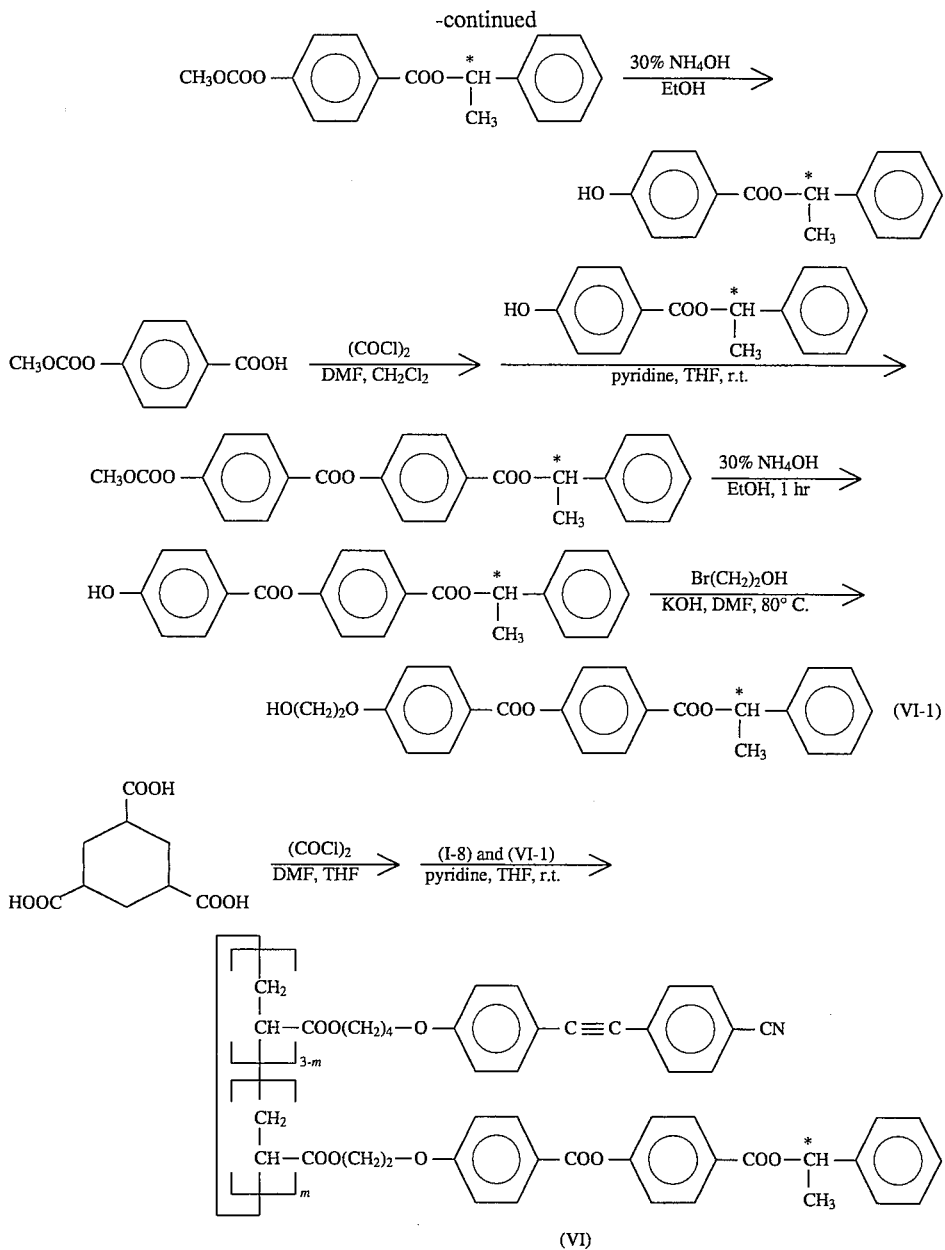

(VI-1):

Intermediate (VI-1) was synthesized following the procedures outlined above for Intermediate (IV-10), using (S)-(−)-1-phenylethanol instead of (S)-(−)-1-phenylethylamine.

(VI):

To a solution of 1,3,5-cyclohexanetricarboxylic acid (0.187 g, 0.86 mmole) and a few drops of N,N-dimethylformamide in 10 mL of anhydrous THF was added dropwise 2M oxalyl chloride solution in anhydrous THF (1.42 mL of solution containing 2.84 mmole of oxalyl chloride) at room temperature. After 1 hr stirring of the reaction mixture, the solvent was evaporated, and excess oxalyl chloride was removed under vacuum. The resultant acid chloride was dissolved in 10 mL of anhydrous THF, and the solution was added to a mixture of (I-8) (0.50 g, 1.72 mmole), (VI-1) (0.43 g, 1.03 mmole) and pyridine (0.23 mL, 2.84 mmole) in 10 mL of anhydrous THF. The reaction mixture was stirred for 12 hr before the solvent was evaporated. The solid residue was purified by flash chromatography on silica gel with methylene chloride as the solvent and the eluent. Further purification was accomplished via precipitation from methanol, yielding the chiral nematic mixture (VI) (0.35 g). HPLC and proton NMR integration analysis revealed that (VI) is a multi-component mixture with an overall chiral mole fraction of 0.11.

EXAMPLE 7

Preparation of Compound (VIII)

Compound (VII) was prepared by the following reaction scheme:

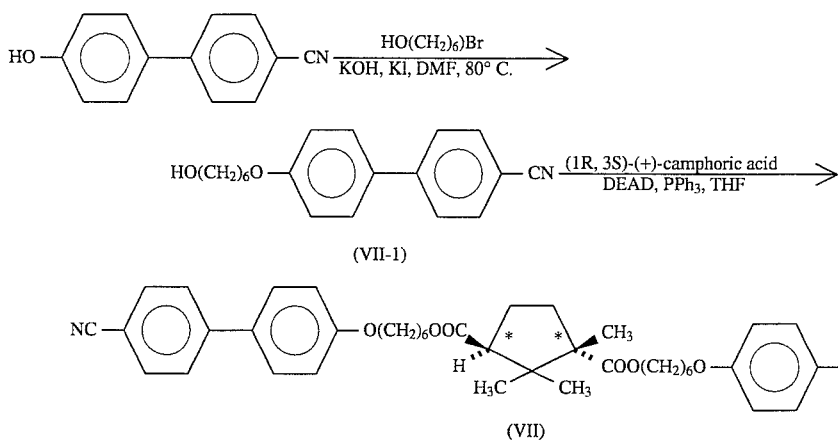

(VII-1):

To a solution at 80° C. of 4-hydroxy-4'-cyanobiphenyl (5.0 g, 25.6 mmole), potassium hydroxide (1.43 g, 25.6 mmole) and a few crystals of potassium iodide in 10 mL of N,N-dimethylformamide was added dropwise 6-bromo-1-hexanol (3.35 mL, 25.6 mmole). The reaction mixture was stirred for 24 hr at 80° C. before dilution with 500 mL of methylene chloride. The resulting solution was dried over anhydrous sodium sulfate and evaporated to dryness. The solid was recrystallized from ethanol to yield (VII-I) (43. g, 57%).

(VII):

To a stirred solution of (VII-1) (0.74 g, 2.51 mmole), triphenylphosphine (0.658 g, 2.51 mmole) and (1R, 3S)-(+)-camphoric acid (0.124 g, 0.573 mmole) in 15 mL of anhydrous THF was added dropwise a solution of diethyl azodicarboxylate (DEAD) (0.31 mL, 2.51 mmole) in 5 mL of anhydrous THF under a nitrogen atmosphere. The reaction mixture was stirred for 3 hr before the solvent was evaporated. The solid residue was purified by flash chromatography on silica gel with 40:1 methylene chloride/acetone as the solvent and the eluent. Further purification was accomplished via precipitation from methanol, yielding (VII) (0.76 g, 92%). Elemental analysis: % Calculated: C, 76.39; H, 7.16; N, 3.71; % Found: C, 76.06; H, 6.82; N, 4.14.

The glass transition temperature, $T_g$, and clearing temperature, $T_c$, for (VII) were determined to be −5° C. and 42° C., respectively.

EXAMPLE 8

Formation of Optical Devices

Optical devices were formed from the chiral nematic liquid crystalline compositions of the invention listed in Table 4. The thermal transition temperatures $T_g$ and $T_c$ shown in Table 4 were determined by differential scanning calorimetry.

TABLE 4

| Optical Device | Liquid Crystalline Composition | $T_g$ (°C.) | $T_c$ (°C.) | Chiral Mole Fraction | $\lambda_R$ (nm) |
|---|---|---|---|---|---|
| A | (IV) | 69 | 137 | 0.33 | 425 |
| B | (IV) + (III) | 68 | 170 | 0.26 | 557 |
| C | (IV) + (III) | 68 | 190 | 0.20 | 705 |

TABLE 4-continued

| Optical Device | Liquid Crystalline Composition | $T_g$ (°C.) | $T_c$ (°C.) | Chiral Mole Fraction | $\lambda_R$ (nm) |
|---|---|---|---|---|---|
| D | (VI) + (I) | 29 | 75 | 0.06 | 964 |
| E | (VII) | −5 | 42 | 0.50* | 1600 |
| F | (I) + (II) | 36 | 85 | 0.62 | 1355 |

*Two asymmetric centers in cycloaliphatic radical and two nematogenic moieties

Films having a thickness of approximately 10 μm were formed from melts of the liquid crystalline compositions between a pair of glass plates (Corning 7059 baria alumina borosilicate glass with a refractive index of 1.53 at 589.3 nm). The devices were heated above the clearing temperature, sheared to induce alignment, and annealed at 95% of the clearing temperature for 1 hour. Selective reflection wavelengths, $\lambda_R$, were determined using a Perkin-Elmer Lambda 9 UV—visible—near IR spectrophotometer.

Optical device A, formed from the chiral nematic liquid crystalline compound (IV), displayed a $\lambda_R$ of 425 nm. Mixtures of (IV) with varying amounts of the nonchiral liquid crystalline compound (III) were used to form devices B and C, whose $\lambda_R$ values were 557 nm and 705 nm, respectively.

Optical device D was formed from a composition comprising (VI), a mixture of chiral nematic liquid crystalline compounds, and the nonchiral liquid crystalline compound (I). The chiral mole fraction of the resulting mixture was 0.06. The selective reflection wavelength of the device was 964 nm.

Optical device E contains a film of compound VII, whose structure comprises two nematogenic moieties attached to a chiral cycloaliphatic radical. Device E exhibited a $\lambda_R$ of 1600 nm.

A mixture of the nonchiral liquid crystalline compound (I) and the chiral compound (II), which had a chiral mole fraction of 0.62, was employed to form optical device F. The selective reflection wavelength, $\lambda_R$, of this device was 1355 nm.

EXAMPLE 9

Preparation of Compound (XXVa)

Compound (XXVa) was prepared by the following reaction scheme:

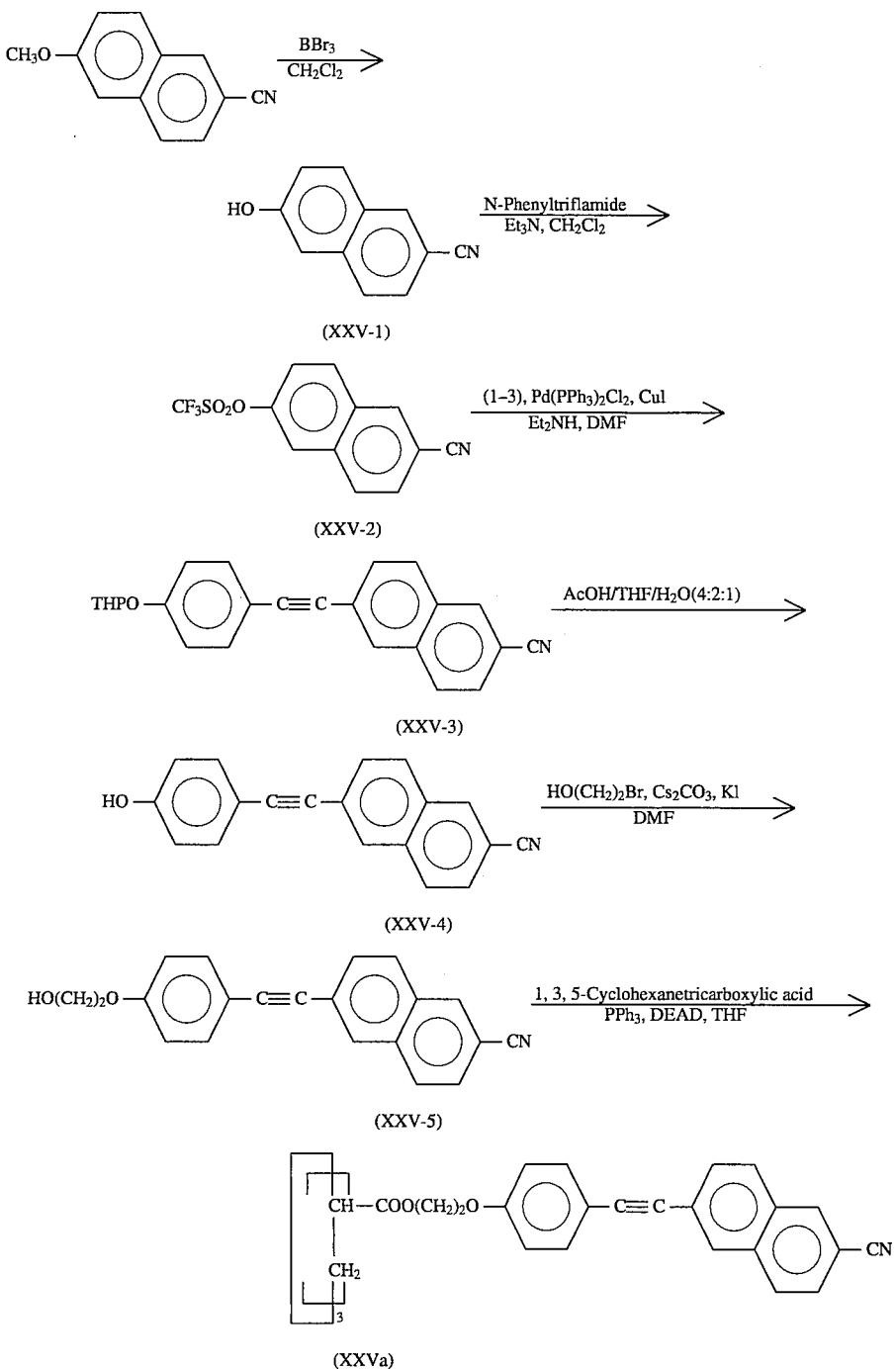

(XXV-1):

A solution of boron tribromide in dry methylene chloride (1M, 100 mL, 100 mmol) was added dropwise to a stirred, cooled (−78° C.) solution of 6-methoxy-2-naphthonitrile (10.0 g, 54.6 mmol), prepared as described in Hird et al., *Liquid Crystals*, 1993, vol. 15(2), pp. 123–150, the disclosures of which are incorporated herein by reference, in dry methylene chloride under argon. The stirred mixture was allowed to warm to room temperature over a period of 9 hr. The mixture was cooled to −10° C., water was added slowly, and the solid was collected by filtration. Recrystallization from ethanol gave compound (XXV-1) (8.8 g, 95%).

(XXV-2):

A solution of N-phenyltriflamide (19 g, 53.2 mmol), obtained from Aldrich Chemical Company, in dry methylene chloride (200 mL) was added dropwise to a stirred, cooled (−78° C.) solution of compound (XXV-1) (8 g, 47.3 mmol) in dry methylene chloride (200 mL) and dry triethylamine (14 mL, 100 mmol) under argon. The stirred mixture was allowed to warm to room temperature overnight. The mixture was washed with aqueous sodium carbonate, and the separated aqueous layer was washed with methylene chloride. The combined organic extracts were washed with water and dried with $MgSO_4$. The solvent was removed in vacuo, and the residue was purified by flash column chromatography with methylene chloride as the eluent. The obtained product was recrystallized from ethanol/water to give (XXV-2) (13.5 g, 95%).

(XXV-3):

Dimethylformamide (115 mL) and diethylamine (67 mL) were added successively into a mixture of compound (XXV-2) (10 g, 33.2 mmol), compound (I-3) (6.71 g, 33.2 mmol), bis(triphenylphosphine)palladium(II) chloride (0.466 g, 0.664 mmol), and copper(I) iodide (0.252 g, 1.33 mmol). The mixture was stirred for 1 hr at room temperature under argon. The solution was diluted with water and extracted with methylene chloride (3×200 mL). The combined extracts were washed with aqueous solution of sodium carbonate and then dried with MgSO$_4$. The solvent was evaporated in vacuo, and the residue was purified by flash chromatography with methylene chloride as the eluent. The crude product was recrystallized from ethanol/ethyl acetate) to give compound (XXV-3) (9.8 g, 84%).

(XXV-4):

Tetrahydrofuran (40 mL), water (20 mL), and acetic acid (80 mL) were successively added to compound (XXV-3). The mixture was stirred at 60° C. for 4 hr. The solvent was partly removed in vacuo, and the product was recrystallized from the remaining solvent to give compound (XXV-4) (6.5 g, 95%).

(XXV-5):

To a solution containing compound (XXV-4) (1.5 g, 5.6 mmol), cesium carbonate (1.82 g, 5.6 mmol), and a few crystals of potassium iodide in dimethylformamide (10 mL) was added dropwise 2-bromoethanol (0.47 mL., 5.6 mmol) at 80° C. The reaction mixture was allowed to stir at 80° C. for 24 hr before dilution with methylene chloride (100 mL). The solution was washed with water and dried with MgSO$_4$. The solvent was removed in vacuo, and the residue was purified by flash chromatography with methylene chloride/acetone (10:1) as the eluent. The crude product was recrystallized from ethanol to give compound (XXV-5) (1.06 g, 61%).

(XXVa):

To a stirred solution containing compound (XXV-5) (0.5 g, 1.60 mmol), triphenylphosphine (0.419 g, 1.60 mmol), and 1,3,5-cyclohexanetricarboxylic acid (0.105 g, 0.48 mmol) in dry tetrahydrofuran (10 mL) was added dropwise a solution of diethyl azodicarboxylate (0.196 mL., 1.60 mmol) in dry tetrahydrofuran (10 mL) under an argon atmosphere. The reaction mixture was stirred for 3 hr before evaporation of the solvent. The residue was purified by flash chromatography with methylene chloride/acetone (40:1) as the eluent. The crude product was dissolved in methylene chloride (2 mL) and precipitated from methanol to give compound (XXVa) (0.48 g, 91%). Elemental analysis. % Calculated: C, 78.47; H, 4.63; N, 3.81. % Found: C, 78.06; H, 4.61; N, 3.72.

The UV spectrum of a methylene chloride solution of (XXVa) showed no light absorption beyond 380 nm.

Thermal transition temperatures were determined for (XXVa); its glass transition temperature, $T_g$, was 60° C., and its clearing temperature, $T_c$, was 197° C.

EXAMPLE 10

Preparation of Compound (XXVb)

Compound (XXVb) was prepared by following reaction scheme:

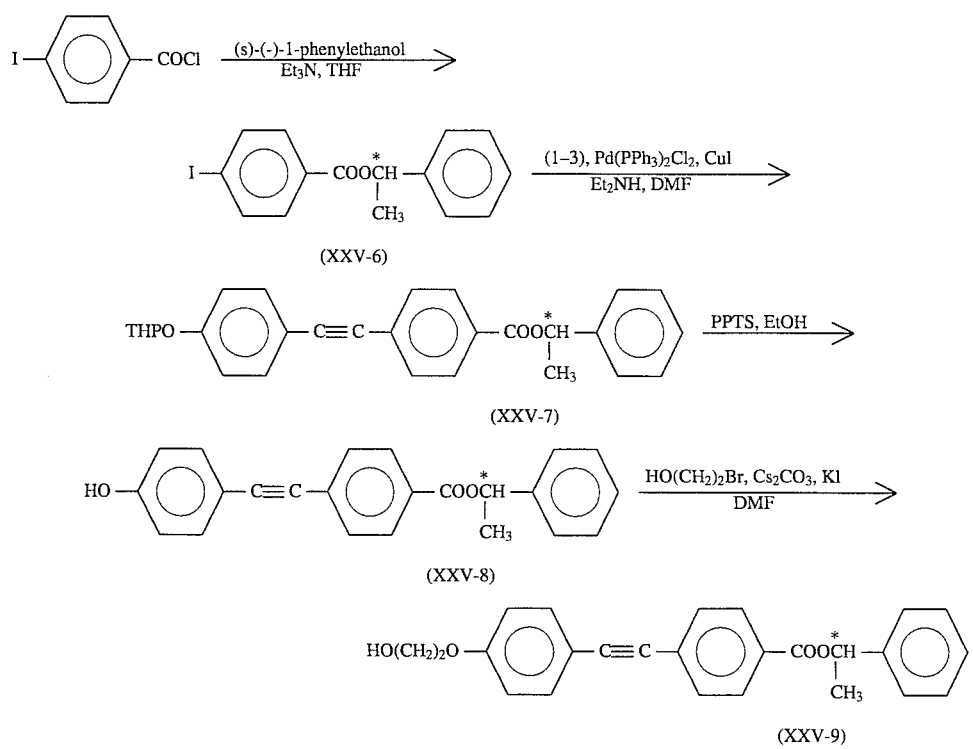

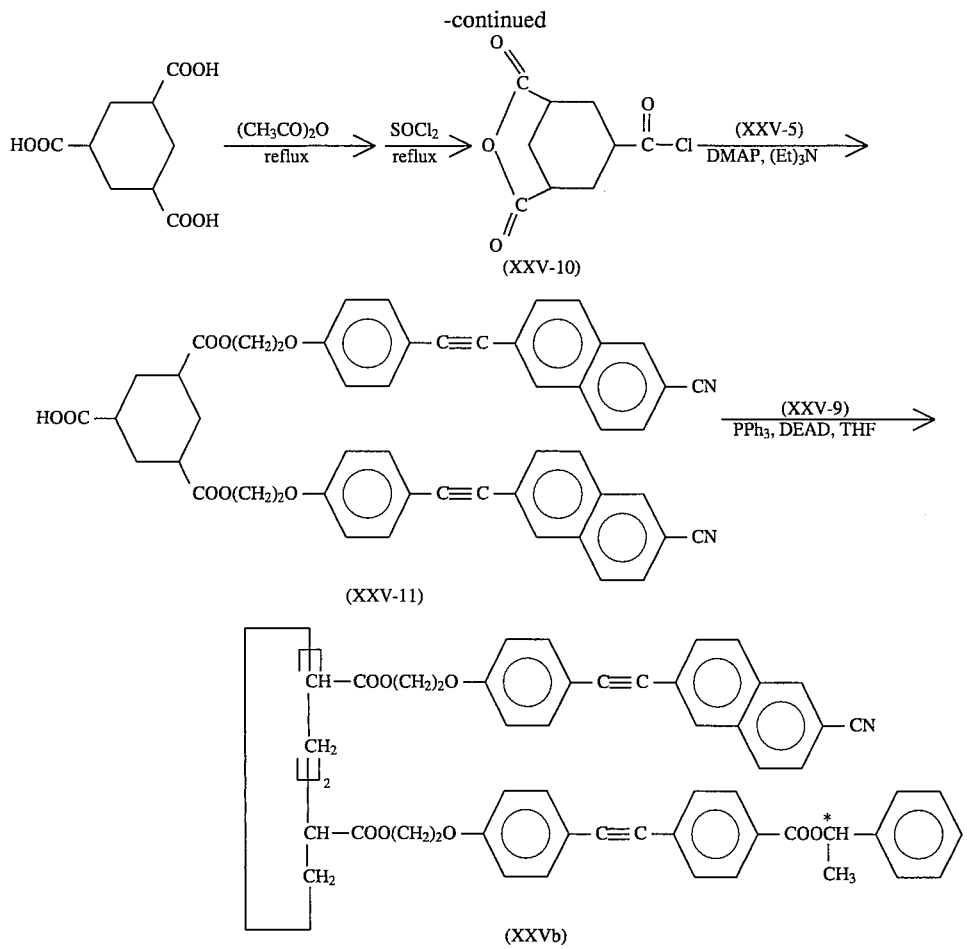

(XXV-6):

To a solution of 4-iodobenzoyl chloride (5.0 g, 18.8 mmol) in dry tetrahydrofuran (40 mL) was added a solution of (S)-(−)-1-phenylethanol (2.29 g, 18.8 mmol) in tetrahydrofuran (20 mL) and triethylamine (2.62 mL, 18.8 mmol) at room temperature. The mixture was stirred for 4 hr before dilution with methylene chloride (200 mL). The solution was washed with water and then dried over anhydrous $MgSO_4$. After removing the solvent in vacuo, the solid product (XXV-6) (5.9 g, 89%) formed from the residual viscous liquid.

(XXV-7):

Dimethylformamide (30 mL) and diethylamine (15 mL) were added successively to a mixture of compound (XXV-6) (4.90 g, 13.9 mmol), compound (I-3) (2.81 g, 13.9 mmol), bis(triphenylphosphine)palladium(II) chloride (0.195 g, 0.278 mmol), and copper(I) iodide (0.105 g, 0.557 mmol). The mixture was stirred under argon for 1 hr at room temperature. The solution was diluted with water and extracted with methylene chloride (3×50 mL). The combined extracts were washed with aqueous sodium chloride and then dried with $MgSO_4$. The solvent was evaporated in vacuo, and the residue was purified by flash chromatography with methylene chloride as the eluent. The product was further purified by recrystallization from ethanol/ethyl acetate to give compound (XXV-7) (4.8 g, 81%).

(XXV-8):

A solution of compound (XXV-7) (4.5 g, 10.6 mmol) and pyridinium p-toluenesulfonate (5.0 g, 19.9 mmol) in ethanol (50 mL) was stirred at 60° C. for 4 hr before dilution with methylene chloride (100 mL). The solution was washed with aqueous sodium chloride and water and then dried with $MgSO_4$. The solvent was removed in vacuo, and the residue was purified by flash chromatography with methylene chloride/acetone (10:1) as the eluent to give compound (XXV-8) (3.5 g, 97%).

(XXV-9):

To a solution containing compound (XXV-8) (1.5 g, 4.39 mmol), cesium carbonate (1.42 g, 4.39 mmol), and a few crystals of potassium iodide in dimethylformamide (10 mL) was added dropwise 2-iodoethanol (0.34 mL, 4.39 mmol) at 80° C. The reaction mixture was allowed to stir at 80° C. for 24 hr before dilution with methylene chloride (100 mL). The solution was washed with water and dried with $MgSO_4$. The solvent was removed in vacuo and the residue was purified by flash chromatography with methylene chloride/acetone (10:1) as the eluent. The product obtained was recrystallized from ethanol to give compound (XXV-9) (0.7 g, 41%).

(XXV-10):

1,3,5-Cyclohexanetricarboxylic acid (10.0 g, 46.3 mmol) was refluxed with acetic anhydride (100 mL) for 24 hr, following the procedure of Kemp et al., *J. Org. Chem.*, 1981, vol. 46, pp 5140–5143. The solvent was evaporated and removed completely under high vacuum. The residue was refluxed with thionyl chloride (40 mL) for 12 hr; the excess thionyl chloride was then removed under vacuum. The crude product was vacuum distilled (2 mm Hg, 160° C.), then purified by recrystallization from dry toluene to give compound (XXV-10) (5.32 g, 53%). Elemental analysis: % Calculated: C, 49.88, H, 4.16. % Found: C, 49.97; H, 4.20.

(XXV-11):

Dry triethylamine (0.134 mL, 0.96 mmol) was added to a solution of compound (XXV-10) (0.104 g, 0.48 mmol), compound (XXV-5) (0.3 g, 0.96 mmol), and 4-dimethyl-aminopyridine (DMAP) (0.006 g, 0.048 mmol) in dry THF (15 mL). After stirring for 24 hr under a nitrogen atmosphere, the reaction mixture was diluted with methylene chloride (50 mL) and neutralized with hydrochloric acid. The organic layer was washed with half-saturated brine and then dried over $MgSO_4$. The solvent was removed in vacuo, and the solid residue was purified by flash chromatography with methylene chloride/methanol (9:1) as the eluent to give compound (XXV-11) (0.306 g, 78%).

(XXVb):

To a stirred solution containing compound (XXV-11) (0.133 g, 0.165 mmol), compound (XXV-9) (0.064 g, 0.165 mmol), and triphenylphosphine (0.048 g, 0.18 mmol) in dry tetrahydrofuran (10 mL) was added dropwise a solution of diethyl azodicarboxylate (0.22 mL., 0.18 mmol) in dry tetrahydrofuran (10 mL) under an argon atmosphere. The reaction mixture was stirred for 3 hr before evaporation of the solvent. The solid residue was purified by flash chromatography with methylene chloride/acetone (40:1) as the eluent. The crude product was dissolved in methylene chloride (2 mL), then precipitated by dilution with methanol to give compound (XXVb) (0.172 g, 88%). Elemental analysis: % Calculated: C, 77.68; H, 4.94; N, 2.39. % Found: C, 77.68; H, 4.98; N, 2.32.

Using differential scanning calorimetry, the glass transition temperature, $T_g$, and clearing temperature, $T_c$, for (XXVb) were determined to be 61° C. and 72° C., respectively.

EXAMPLE 11

Preparation of Compound (XXVc)

Compound (XXVc) was prepared by the following reaction scheme:

(XXV-12):

To a solution of compound (XXV-10) (0.061 g, 0.282 mmol), compound (XXV-9) (0.218 g, 0.564 mmol), and 4-dimethyl-aminopyridine (DMAP) (0.004 g, 0.033 mmol) in dry THF (15 mL) was added dry triethylamine (0.079 mL, 0.564 mmol). After stirring for 24 hr under a nitrogen atmosphere, the reaction mixture was diluted with methylene chloride (50 mL) and neutralized with hydrochloric acid. The organic layer was washed with half-saturated brine and then dried over $MgSO_4$. The solvent was removed in vacuo, and the residue was purified by flash chromatography with methylene chloride/methanol (9:1) as the eluent to yield compound (XXV-12) (0.191 g, 71%).

(XXVc):

To a stirred solution containing compound (XXV-12) (0.140 g, 0.147 mmol), compound (XXV-5) (0.055 g, 0.176 mmol), and triphenylphosphine (0.039 g, 0.176 mmol) in dry tetrahydrofuran (10 mL) was added dropwise a solution of diethyl azodicarboxylate (0.018 mL, 0.176 mmol) in dry tetrahydrofuran (10 mL) under an argon atmosphere. The reaction mixture was stirred for 3 hr before evaporation of the solvent. The residue was purified by flash chromatography with methylene chloride/acetone (40:1) as the eluent. The crude product was dissolved in methylene chloride (2 mL), then precipitated by dilution with methanol to give compound (XXVc) (0.129 g, 70%). Elemental analysis: % Calculated: C, 76.98; H, 5.21; N, 1.12. % Found: C, 76.80; H, 5.27; N, 1.05.

Compound (XXVc), whose glass transition temperature was 59° C., was observed to be nonmesomorphic.

EXAMPLE 12

Preparation of Compound (XXVd)

To a stirred solution containing compound (XXV-9) (0.515 g, 1.334 mmol), 1,3,5-cyclohexanetricarboxylic acid (0.087 g, 0.404 mmol) and triphenylphosphine (0.35 g, 1.334 mmol) in dry tetrahydrofuran (10 mL) was added

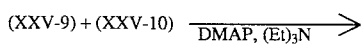

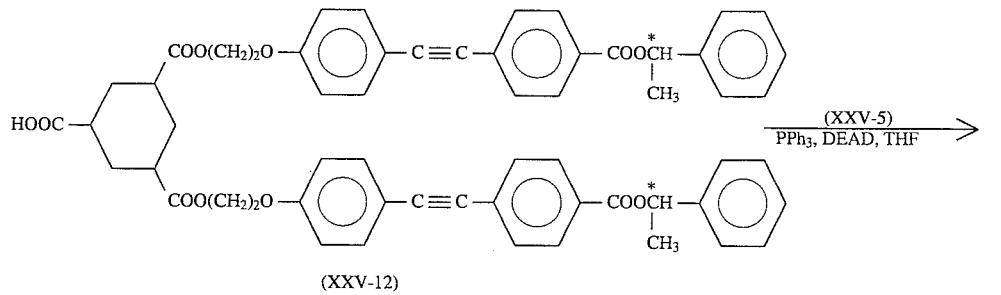

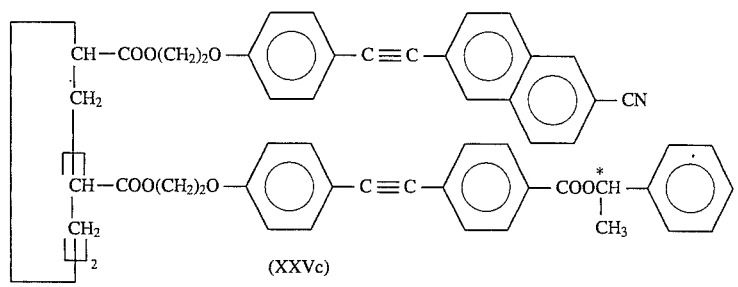

dropwise a solution of diethyl azodicarboxylate (0.163 mL, 1.334 mmol) in dry tetrahydrofuran (10 mL) under an argon atmosphere. The reaction mixture was stirred for 3 hr before evaporation of the solvent. The residue was purified by flash chromatography with methylene chloride/acetone (40:1) as the eluent. The crude product was dissolved in methylene chloride (2 mL), then precipitated by dilution with methanol to give compound (XXVd) (0.487 g, 91%). Elemental analysis: % Calculated: C, 76.36; H, 5.45. % Found: C, 76.57; H, 5.60.

The UV spectrum of a methylene chloride solution of (XXVd) showed no light absorption beyond 370 nm.

Compound (XXVd), whose measured glass transition temperature was 58° C., was nonmesomorphic.

EXAMPLE 13

Formation of Optical Devices from Mixtures of (XXVa) with Various Chiral Compounds Optical devices were formed from chiral nematic liquid crystalline compositions that were mixtures of (XXVa) with various chiral compounds, and measurements were performed on the resulting devices by the procedures described in Example 8. The results of the measurements are given in Table 5 below; the chiral mole fraction of each composition is defined as the ratio of the number of moles of chiral moieties to the total number of moles of chiral and nematogenic moieties.

TABLE 5

| Optical Device | Liquid Crystalline Composition | $T_g$ (°C.) | $T_c$ (°C.) | Chiral Mole Fraction | $\lambda_R$ (nm) |
|---|---|---|---|---|---|
| G | (XXVa) + (XXVb) | 62 | 135 | 0.16 | 509 |
| H | (XXVa) + (XXVb) | 62 | 155 | 0.12 | 713 |
| J | (XXVa) + (XXVb) | 62 | 169 | 0.08 | 1024 |
| K | (XXVa) + (XXVc) | 63 | 146 | 0.16 | 570 |
| L | (XXVa) + (XXVc) | 62 | 155 | 0.12 | 709 |
| M | (XXVa) + (XXVc) | 61 | 170 | 0.08 | 1116 |
| N | (XXVa) + (XXVd) | 62 | ~170 | 0.16 | 1611 |
| P | (XXVa) + (XXVd) | 62 | 178 | 0.12 | 1611 |
| Q | (XXVa) + (XXVd) | 62 | 180 | 0.08 | 1631 |
| R | (XXVa) + (XXV-8) | 50 | 128 | 0.16 | 633 |
| S | (XXVa) + (XXV-9) | 51 | 144 | 0.16 | 553 |

Optical devices G, H, and J, which are formed from mixtures of compounds (XXVa) and (XXVb) in various molar ratios, exhibited selective reflection wavelengths $\lambda_R$ from the visible into the near infrared, ranging from 508 nm at a chiral mole fraction of 0.16 to 1024 nm at a chiral mole fraction of 0.08.

Devices K, L, and M, formed from mixtures of (XXVa) and (XXVc), exhibited a similar wide range of $\lambda_R$ values, from 570 nm at a chiral mole fraction of 0.16 to 1116 nm at a chiral mole fraction of 0.08.

Unlike the previously described devices, optical devices N, P, and Q, formed from various molar ratios of (XXVa) and (XXVd), all exhibited selective reflection wavelength values within a very narrow range in the infrared, beyond 1600 nm.

Optical devices R and S, formed from mixtures of (XXVa) with chiral compounds (XXV-8) and (XXV-9), respectively, at a chiral mole fraction of 0.16, both displayed $\lambda_R$ values in the visible range, at 633 nm and 553 nm, respectively.

The invention has been described in detail with particular reference to preferred embodiments thereof, but it will be understood that variations and modifications can be effected within the spirit and scope of the invention.

What is claimed is:

1. A glassy thermotropic chiral nematic liquid crystalline composition comprising a glassy chiral nematic compound of low molar mass having the formula:

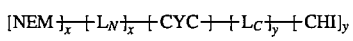

or a mixture of a nematic liquid crystalline compound of low molar mass having the formula:

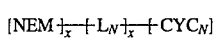

and a chiral compound of low molar mass having the formula:

where

each independently represents a cycloaliphatic radical containing about 4 to 18 carbon atoms;

represents a nematogenic moiety having the formula:

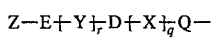

where —Q— is an alkylene radical containing 1 to about 8 carbon atoms, —X— is —O—, —S—, or —CH$_2$—, —Y— is

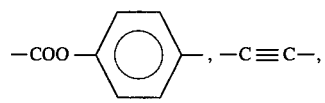

—D— and —E— are each independently

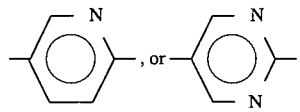

—Z is —CN, —NO$_2$, —N=C=S, or an alkoxy, an alkylsulfonyl, or an arylsulfonyl radical containing up to about 8 carbon atoms, and q and r are each independently 0 or 1;

represents a chiral moiety having the formula:

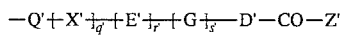

where Q' is an alkylene radical containing 1 to about 8 carbon atoms, —X' is —O—, —S—, or —CH$_2$—, —D'— and —E'— are each independently

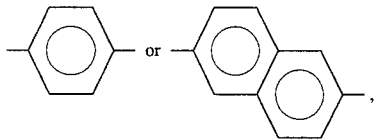

—G— is —C≡C—, —COO—, or —OOC—, Z' is an alkoxy, aralkoxy, alkylamino, or aralkylamino radical containing about 4 to 20 carbon atoms and containing at least one asymmetric carbon atom, and q', r', and s' are each independently 0 or 1;

[CHI]' represents a chiral compound having the formula:

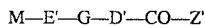

where —D'— and —E'— are each independently

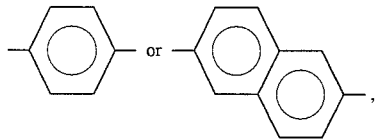

—G— is

—M is —H, —CN, —NO$_2$, —N=C=S, —OH, or an alkoxy, an alkylsulfonyl, or an arylsulfonyl radical containing up to about 8 carbon atoms, and Z' is an alkoxy, aralkoxy, alkylamino, or aralkylamino radical containing about 4 to 20 carbon atoms and containing at least one asymmetric carbon atom;

—L$_N$— and —L$_C$— each individually represents a connecting group having the formula:

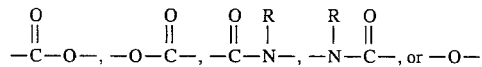

where R is hydrogen or alkyl containing up to 4 carbon atoms, or forms a portion of a cycloaliphatic radical containing about 4 to 18 carbon atoms; and x is 1 to 6, and y is at least 1, with the proviso that when

is chiral, y can be zero.

2. A composition of claim 1 where the sum of x and y is from 3 to 6.

3. A composition of claim 1 where x is 1 to 3.

4. A composition of claim 1 where —X— is —O—, —Y— is —C≡C— or p-carbonyloxyphenyl, both —D— and —E— are p-phenylene, —Z is —CN or —OCH$_3$, q is 1, and r is 0 or 1.

5. A composition of claim 4 where —Q— contains 2 to 4 carbon atoms and —Z is —CN.

6. A composition of claim 1 where Z' is an alkoxy or aralkoxy radical derived from an alcohol.

7. A composition of claim 6 where said alcohol is 1-phenylethanol.

8. A composition of claim 1 where Z' is an alkylamino or aralkylamino radical derived from an amine.

9. A composition of claim 8 where said amine is 1-phenylethylamine.

10. A composition of claim 1 where

each independently contains about 5 to 10 carbon atoms.

11. A composition of claim 10 where

each independently contains 6 carbon atoms.

12. A composition of claim 11 where

contains 6 carbon atoms, x is 2, and y is 1.

13. A composition of claim 1 where

is chiral and y is zero.

14. A composition of claim 1 where

further includes a nitrogen or oxygen atom.

15. A composition of claim 1 where

is polycyclic.

16. A composition of claim 1 comprising a plurality of chiral nematic compounds.

17. A composition of claim 1 comprising

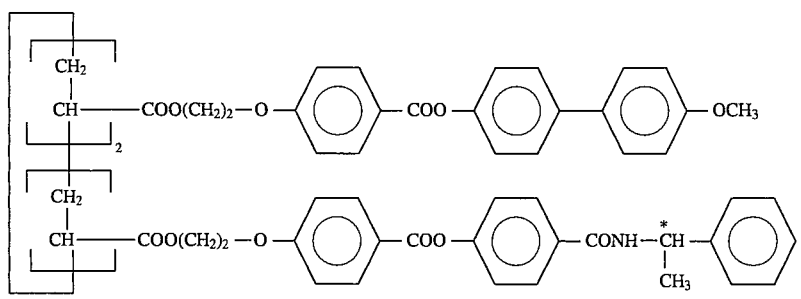
(IV)
18. A composition of claim 17 further comprising
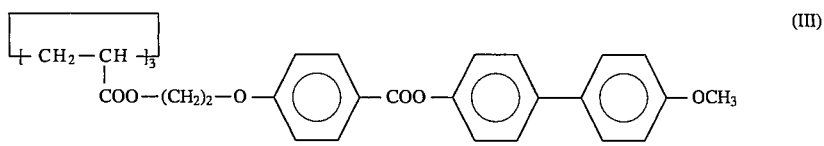
(III)
19. A composition of claim 1 comprising the chiral mixture
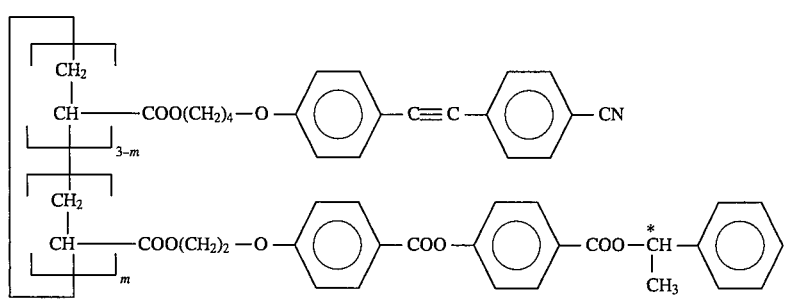
(VI)
having a chiral mole fraction of 0.11.
20. A composition of claim 19 further comprising
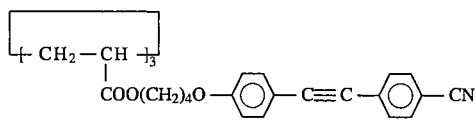
21. A composition of claim 1 comprising
22. A composition of claim 1 comprising a mixture of
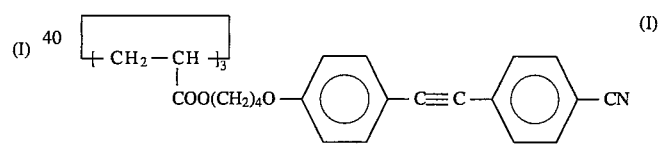
(I)
and
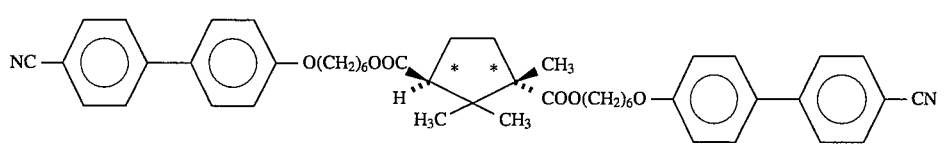
(VII)
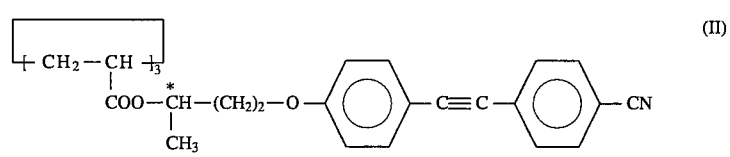
(II)

23. A composition of claim 1 comprising:

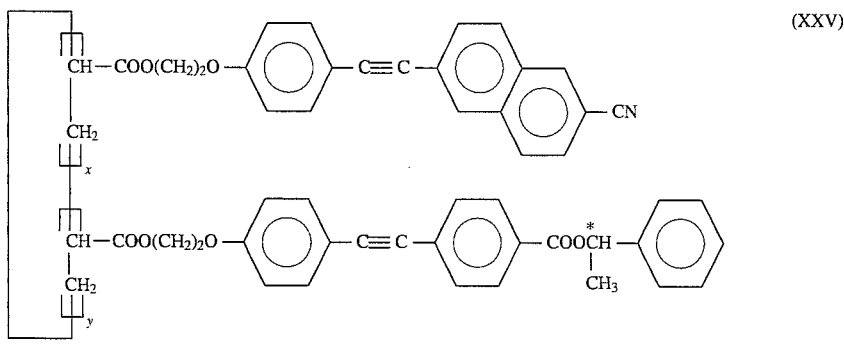
(XXV)

where x is 3 and y is 0.

24. A composition of claim 23 further comprising

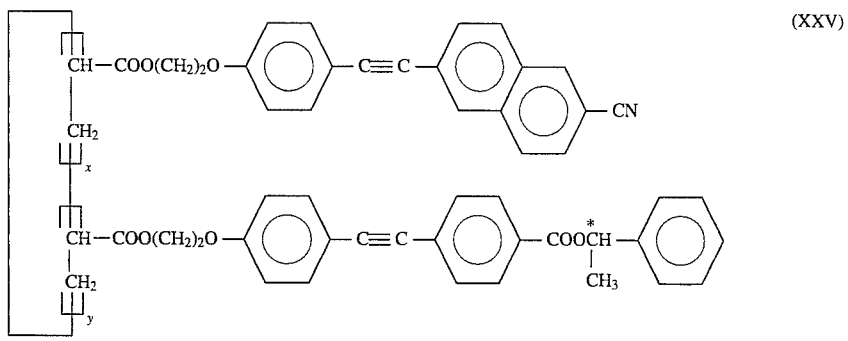
(XXV)

where the sum of x and y is 3 and y is 1, 2, or 3.

25. A composition of claim 23 further comprising

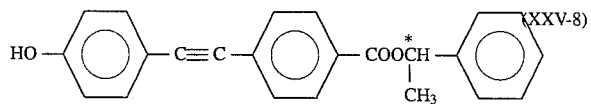
(XXV-8)

26. A composition of claim 23 further comprising

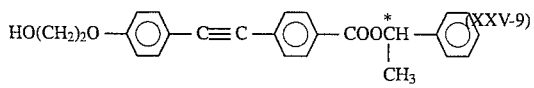
(XXV-9)

27. A composition of claim 23 further comprising

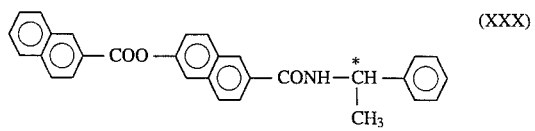
(XXX)

28. A composition of claim 1 wherein the chiral mole fraction of chiral moiety is about 0.01–0.7.

29. A composition of claim 28 wherein said chiral mole fraction is about 0.05–0.5.

30. An optical device comprising an optically transparent substrate and a film formed from a glassy thermotropic chiral nematic liquid crystalline composition comprising a glassy chiral nematic compound of low molar mass having the formula:

$[NEM]_{\overline{x}}\text{+}[L_N]_{\overline{x}}\text{+}CYC\text{+}\text{+}L_C\text{+}_{\overline{y}}\text{+}CHI]_y$ or a mixture of a nematic liquid crystalline compound of low molar mass having the formula:

$[NEM]_{\overline{x}}\text{+}[L_N]_{\overline{x}}\text{+}CYC_N]$ and a chiral compound of low molar mass having the formula:

$[CYC_c\text{+}\text{+}L_c\text{+}_{\overline{y}}\text{+}CHI]_Y$ or $[CHI]'$ where $+CYC+$, $+CYC_N]$, and $[CYC_c+$ each independently represents a cycloaliphatic radical containing about 4 to 18 carbon atoms;

$[NEM+$ represents a nematogenic moiety having the formula:

$Z\text{—}E\text{+}Y\text{+}_{\overline{r}}D\text{+}X\text{+}_{\overline{q}}Q\text{—}$ where —Q— is an alkylene radical containing 1 to about 8 carbon atoms, —X— is —O—, —S—, or —CH$_2$—, —Y— is

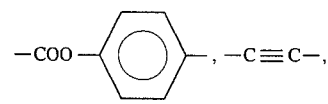

-continued

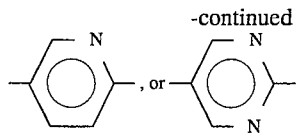

—D— and —E— are each independently

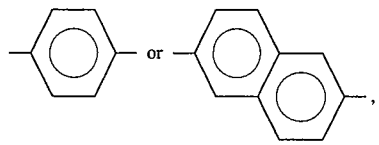

—Z is —CN, —NO$_2$, —N=C=S, or an alkoxy, an alkylsulfonyl, or an arylsulfonyl radical containing up to about 8 carbon atoms, and q and r are each independently 0 or 1;

$$[CHI]$$

represents a chiral moiety having the formula:

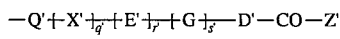

where Q' is an alkylene radical containing 1 to about 8 carbon atoms, —X' is —O—, —S—, or —CH$_2$—, —D'— and —E'— are each independently

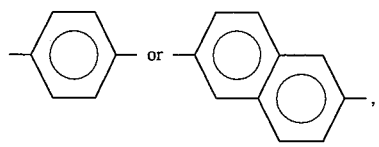

—G— is —C≡C—, —COO—, or —OOC—, Z' is an alkoxy, aralkoxy, alkylamino, or aralkylamino radical containing about 4 to 20 carbon atoms and containing at least one asymmetric carbon atom, and q', r', and s' are each independently 0 or 1;

$$[CHI]'$$

represents a chiral compound having the formula:

M—E'—G—D'—CO—Z' where —D'— and —E'— are each independently

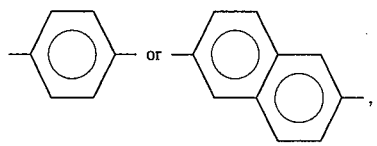

—G— is

—C≡C—, —COO—, or —OOC—,

—M is —H, —CN, —NO$_2$, —N=C=S, —OH, or an alkoxy, an alkylsulfonyl, or an arylsulfonyl radical containing up to about 8 carbon atoms, and Z' is an alkoxy, aralkoxy, alkylamino, or aralkylamino radical containing about 4 to 20 carbon atoms and containing at least one asymmetric carbon atom;

—L$_N$— and —L$_C$— each individually represents a connecting group having the formula:

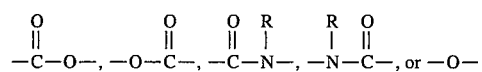

where R is hydrogen or alkyl containing up to 4 carbon atoms, or forms a portion of a cycloaliphatic radical containing about 4 to 18 carbon atoms; and x is 1 to 6, and y is at least 1, with the proviso that when

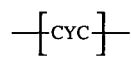

is chiral, y can be zero.

31. An optical device according to claim 30 where said substrate is glass or fused quartz.

32. An optical device according to claim 30 where said film has a thickness of about 0.5 μm to 50 μm.

33. An optical device according to claim 32 where said thickness is about 5 μm to 20 μm.

34. An optical device according to claim 30 where said chiral nematic liquid crystalline composition comprises (IV)

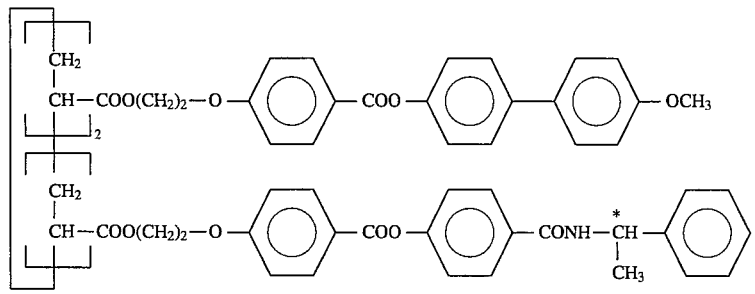

35. An optical device according to claim 34 where said chiral nematic liquid crystalline composition further comprises

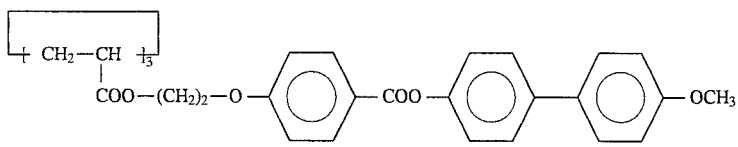
(III)

36. An optical device according to claim 30 where said chiral nematic liquid crystalline composition comprises the chiral mixture

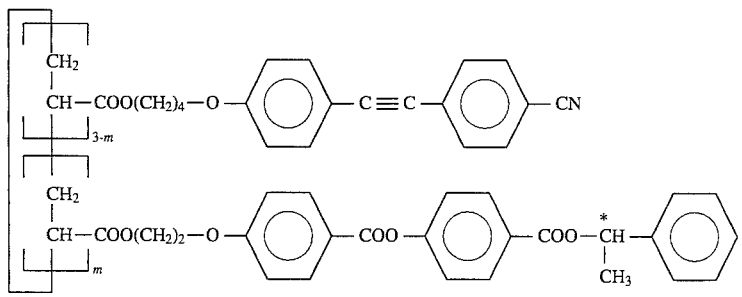
(VI)

having a chiral mole fraction of 0.11.

37. An optical device according to claim 36 where said chiral nematic liquid crystalline composition further comprises

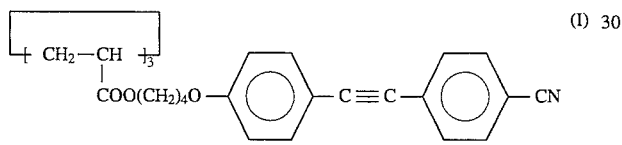
(I)

38. An optical device according to claim 30 where said chiral nematic liquid crystalline composition comprises

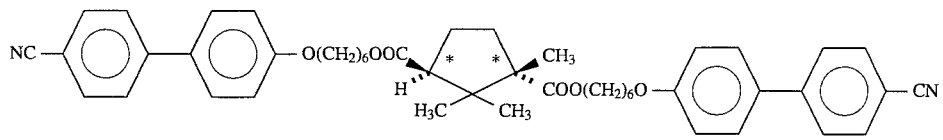

39. An optical device according to claim 30 where said chiral nematic liquid crystalline composition comprises a mixture of

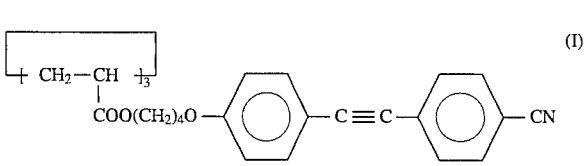
(I)

(VII)

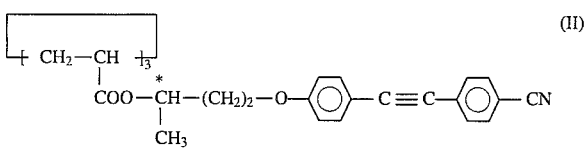
(II)

and

40. An optical device according to claim 30 where said chiral nematic liquid crystalline composition comprises

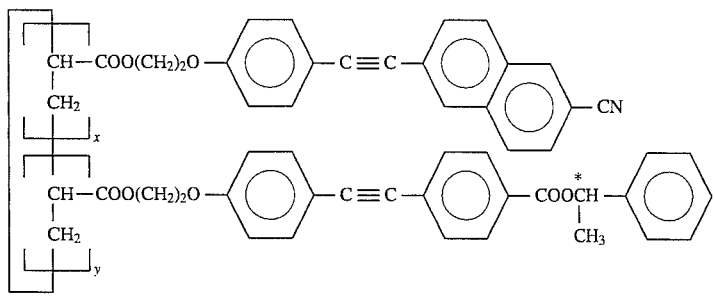
(XXV)

where x is 3 and y is 0.
41. An optical device according to claim 40 where said chiral nematic liquid crystalline composition further comprises
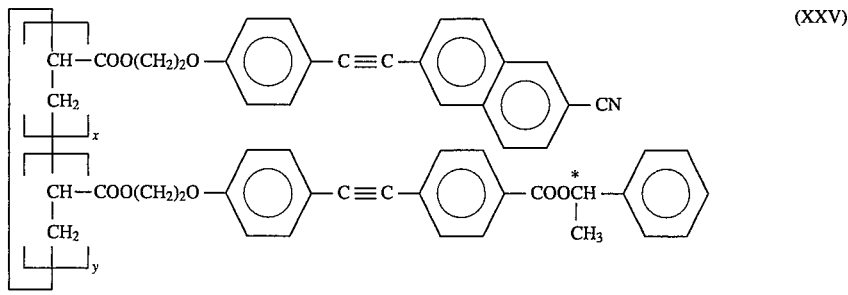
(XXV)
where the sum of x and y is 3 and y is 1, 2, or 3.
42. An optical device according to claim 40 where said chiral nematic liquid crystalline composition further comprises
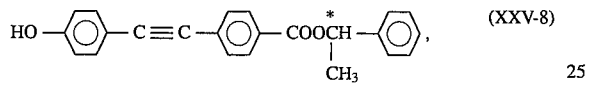
(XXV-8)
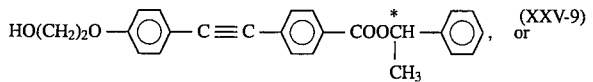
(XXV-9) or
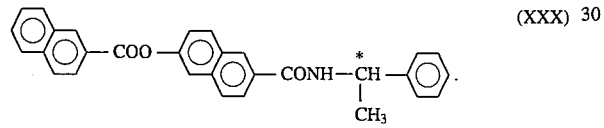
(XXX)
* * * * *